(12) United States Patent
Tarumi et al.

(10) Patent No.: US 8,104,840 B2
(45) Date of Patent: Jan. 31, 2012

(54) ATTACHABLE AND DETACHABLE TYPE SEAT PAD AND METHOD OF FABRICATING THE SAME, AND SEAT USING ATTACHABLE AND DETACHABLE TYPE SEAT PAD

(75) Inventors: Akira Tarumi, Toyota (JP); Hitoshi Yasuda, Nagoya (JP); Kazukimi Shinohara, Nagoya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 274 days.

(21) Appl. No.: 12/515,579

(22) PCT Filed: Nov. 13, 2007

(86) PCT No.: PCT/JP2007/071972
§ 371 (c)(1),
(2), (4) Date: May 20, 2009

(87) PCT Pub. No.: WO2008/075515
PCT Pub. Date: Jun. 26, 2008

(65) Prior Publication Data
US 2010/0026077 A1   Feb. 4, 2010

(30) Foreign Application Priority Data

Dec. 20, 2006  (JP) ............................... 2006-342500
Dec. 20, 2006  (JP) ............................... 2006-342501

(51) Int. Cl.
*A47C 7/02* (2006.01)
(52) U.S. Cl. ......... 297/452.48; 297/452.21; 297/452.29; 297/219.1
(58) Field of Classification Search ............... 297/219.1, 297/228.13, 228.1, 452.21, 452.27, 452.29, 297/452.32, 452.48, 440.11, 440.2, 440.22, 297/452.22, 452.26; 5/653, 654
See application file for complete search history.

(56) References Cited

U.S. PATENT DOCUMENTS 5,286,086 A * 2/1994 Gunji ........................ 297/250.1
(Continued)

FOREIGN PATENT DOCUMENTS
EP       1714583      10/2006
(Continued)

OTHER PUBLICATIONS

English language Abstract of JP 9-239166 A, Sep. 16, 1997.
(Continued)

*Primary Examiner* — Sarah B McPartlin
(74) *Attorney, Agent, or Firm* — Greenblum & Bernstein, P.L.C.

(57) ABSTRACT

Seat pads of the present invention are sewn by hollow weave, and includes skins having single sheets of woven cloth integrally continuously having single layer portions and laminated layers portions in a shape of a hollow bag, and cushioning members enclosed at inner portions of the laminated layers portions and having a shape the same as that of the laminated layers portion and having an elasticity, the laminated layers portions are formed at portions of the single sheets of woven cloth intended to support the physical body of a seated person, the cushioning members are provided with predetermined thicknesses, the laminated layers portion are formed with recesses and projections of the same shape projected by a predetermined amount from head and tail faces of the single layer portions, and attachably and detachably mounted to a seating face of a seat, a recessed portion constituting a shape the same as that of the laminated layers portion is formed at a position of the seating face of the seat facing the laminated layers portions, and when mounted to the seat, the laminated layers portions are contained in the recessed portion of the seating face.

19 Claims, 14 Drawing Sheets

U.S. PATENT DOCUMENTS

| | | | | |
|---|---|---|---|---|
| 5,395,162 | A | * | 3/1995 | Jay et al. .................. 297/452.25 |
| 5,826,937 | A | * | 10/1998 | Massara ..................... 297/284.6 |
| 6,159,172 | A | * | 12/2000 | Gray et al. ................... 601/149 |
| 6,332,651 | B1 | * | 12/2001 | Horisawa ................. 297/452.11 |
| D529,324 | S | * | 10/2006 | Yates .............................. D6/601 |
| 7,530,640 | B2 | * | 5/2009 | Walters et al. ........... 297/440.22 |
| 2006/0170274 | A1 | | 8/2006 | Moule |
| 2007/0001505 | A1 | | 1/2007 | Marshall et al. |

FOREIGN PATENT DOCUMENTS

| | | |
|---|---|---|
| FR | 2814709 | 4/2002 |
| FR | 2816261 | 5/2002 |
| JP | 61-253011 | 11/1986 |
| JP | 61-253011 A | 11/1986 |
| JP | 5-020649 U | 3/1993 |
| JP | 9-84652 | 3/1997 |
| JP | 9-239166 A | 9/1997 |
| JP | 9-271423 | 10/1997 |
| JP | 2000-342389 A | 12/2000 |
| JP | 2001-70084 | 3/2001 |
| JP | 2001-169850 | 6/2001 |
| JP | 2001-169850 A | 6/2001 |
| JP | 2002-165669 A | 6/2002 |
| JP | 2005-152158 A | 6/2005 |
| JP | 2006-288497 | 10/2006 |
| WO | 2005/002915 | 1/2005 |

OTHER PUBLICATIONS

English language Abstract of JP 2001-169850 A, Jun. 26, 2001.
Search report from E.P.O., mail date is Sep. 9, 2011.

* cited by examiner

ATTACHABLE AND DETACHABLE TYPE SEAT PAD AND METHOD OF FABRICATING THE SAME, AND SEAT USING ATTACHABLE AND DETACHABLE TYPE SEAT PAD

TECHNICAL FIELD

The present invention relates to a seat pad of an attachable and detachable type mounted to a seating face of a seat and a method of fabricating the same, as well as a seat mounted with the attachable and detachable type seat pad attachably and detachably to and from a seating face of the seat.

BACKGROUND OF THE INVENTION

As a seat pad of this kind, there is, for example, Patent Reference 1. A seat of Patent Reference 1 divides a seat pad into a plurality of pieces of unit pads and mounts the respective unit pads attachably and detachably to and from a seating face of a seat main body. Each of the unit pads is constituted by a cushioning member and a skin covered from thereabove, a lower end of the skin is provided with a plurality of pieces of engaging members in a shape of a hook, and the unit pad is mounted thereto by hanging to fix the respective engaging members to engaging holes bored at predetermined portions on a seat surface.

Further, there is also Patent Reference 2 as a cushion pad mounted to a bed or a chair although not for a seat. The cushion pad having a sewn skin comprising one sheet of woven cloth having a single layer portion and a laminated layers portion in a shape of a hollow bag by hollow weave, and an elastic member is inserted into the hollow laminated layers portion. Further, a massage effect or a manual therapeutic effect is given to a user by a recessed and projected shape of a surface formed by aligning to form a plurality of pieces of the laminated layers portions.

Further, as a seat having a seat pad of an attachable and detachable type, there are Patent Reference 3 and Patent Reference 4. A seat of Patent Reference 3 is formed with a recessed portion of receiving a seat pad at a seating face of a seat main body, and a back face of the seat pad is formed by a shape matching with the recessed portion of the seat main body. Further, the seat pad is attachably and detachably mounted to the seat main body by fitting the seat pad to the recessed portion of the seat main body and engaging to attach the seat main body and the seat pad by a velvet fastener (face fastener). Although also a seat of Patent Reference 4 is formed with a recessed portion of receiving a seat pad at a seating face of a seat main body, a portion brought into contact with a bottom face of an inner peripheral wall of the recessed portion is formed with a side wall recessed portion, and a back face side of the seat pad is provided with a base plate. Further, the seat pad is attachably and detachably mounted to the seat main body by fitting a peripheral end portion of the base plate to the side wall recessed portion of the seat main body.

Patent Reference 1: JP-A-9-2399166
Patent Reference 2: JP-A-2000-342389
Patent Reference 3: JP-A-61-253011
Patent Reference 4: JP-A-2001-169850

According to Patent Reference 1, by constituting the seat pad by the plurality of pieces of divided unit pads, an efficient support can be carried out by fitting the seat pad precisely to a physical figure of a seated person. However, by constituting the seat pad by the plurality of pieces of independent unit members, the respective unit pads need to be respectively provided with engaging means in order to make the respective unit pads attachable and detachable to and from the seat main body. Thereby, productivity is poor and also an attaching and detaching operation thereof is complicated.

In contrast thereto, the cushion pad of Patent Reference 2 is formed as a single member joined with the plurality of pieces of elastic members by the single skin by sewing the skin via the hollow weave, and therefore, productivity or handling thereof is easy to achieve. However, the cushion pad of Patent Reference 2 is only aligned with the plurality of pieces of elastic members in a shape of a round bar for bringing about the massage effect or the manual therapeutic effect, and cannot provide an efficient support precisely matching with a physical figure of a person seated on the seat. Further, the cushion pad of Patent Reference 2 is not particularly provided with means for engaging with a mounting face, but is an object used by being simply mounted on a bed or a chair, and therefore, even when the cushion pad is applied to a seat, the cushion pad is easily shifted positionally by changing an attitude of the seated person or by an inertia gravitational force (G) thereof or the like, and a way of use thereof is poor.

Further, although according to the seat pads of Patent Reference 3 and Patent Reference 4, the seat pads are made to be able to be cleaned or interchanged by being made to be attachable and detachable to and from the seat main bodies, in both thereof, means for engaging with seat main bodies are provided at the back faces of the seat pads. Therefore, only one face (surface) of the seat pad always constitutes a seating face, and damage, or an aging deterioration thereof becomes remarkably significant in comparison with the other face (back face) by being exposed to direct sunlight or by receiving a load of the seated person.

Therefore, there is a need in the art for a seat pad having a high productivity or a high degree of freedom of design by sewing a skin by hollow weave. Further, there is a need in the art for a seat pad facilitating attaching and detaching operation by forming the seat pad as a single member although the seat pad is divided into a plurality of pieces thereof. Further, there is a need in the art for a method of fabricating a seat pad capable of being fabricated efficiently. Further, there is a need in the art for a seat using a reversible seat pad capable of using both head and tail faces.

There is a seat pad as one aspect of the invention. The seat pad of the invention includes a skin including one sheet of woven cloth sewn by hollow weave and integrally continuously having a single layer portion and a laminated layers portion in a shape of a hollow bag, and a cushioning member enclosed at an inner portion of the laminated layers portion and having a shape the same as a shape of the laminated layers portion and having an elasticity, wherein the laminated layers portion is formed at a portion of the one sheet of woven cloth intended to support the physical body of a seated person, and wherein the cushioning member is provided with a predetermined thickness, and the laminated layers portion is formed with recesses and projections of the same shape projected from head and tail faces of the single layer portion by a predetermined amount, and mounted attachably and detachably to a seating face of a seat, and at a position of the seating face of the seat facing the laminated layers portion, a recessed portion constituting a shape the same as a shape of the laminated layers portion is formed, and the laminated layers portion is contained in the recessed portion of the seating face when the laminated layers portion is mounted to the seat.

The seating face of the seat in this case may be constituted by a total of the seating face of the seat or may be constituted by a portion thereof. That is, there is a case of only the seating face of the seat cushion or only the seating face of the seat back, and there is also a case of seating faces of both of the seat cushion and the seat back. The hollow weave is one of double weave fabricating methods mixed continuously with the laminating layers portion of laminating a head structure and a tail structure by respectively constituting head and tail warp and weft structures by plain weave in one sheet of an woven cloth, and a single layer portion constituting one structure by weaving the head and tail warp and weft structures. By weaving the single layer portion to surround the laminated layers portion, the laminated layers portion is constituted by the shape of the hollow bag. In other words, an outer periphery of the laminated layers portion in the space of the hollow bag is closed by the single layer portion.

A plurality of pieces of the laminated layers portions are formed in the skin including one sheet of the woven cloth respectively independently from each other. A thickness of the laminated layers portion is provided with a dimension twice as much as a depth of the recessed portion, and when the seat pad is mounted to the seat main body, although a rear face of the laminated layers portion and a bottom face of the recessed portion are brought into close contact with each other, a rear face of the single layer portion and a surface of the seat are not brought into close contact with each other. At least a portion of an outer peripheral edge of the seat pad is provided with an engaging member capable of being engaged with an engaging portion formed at the seat; and wherein the engaging member is provided at a center portion in a thickness direction of the seat pad. The engaging member is provided at a front end of a flexible fabric member extended from the outer peripheral edge of the seat pad. Here, the fabric member signifies a fiber product of a woven product, a knitted product or the like. Further, in the shape of the strip, there is a case of being prolonged laterally and there is also a case of prolonged vertically in a left and right direction. Further, the fabric member may integrally be extended from the seat pad, or may be bonded to the seat pad by seaming or adhering after having been molded as a member separate from the seat pad.

It is preferable that the fabric member is formed the single layer portion. Attaching means for making the seat pad in line with a shape of a surface of the seat when the seat pad is mounted to the seat is provided. The laminated layers portion is embedded with a core member for holding a shape thereof. That is, even the flexible seat pad having the elasticity is made to able to hold the shape in the constant recessed and projected state. Colors of a surface and a rear face of the laminated layers portion are made to differ from each other.

As other of the invention, there is a method of fabricating the seat pad. According to a method of fabricating a seat pad of the invention, a textile fabric integrally continuously having single layer portions and laminated layers portions in a shape of a hollow bag of the same patterns is sewn by hollow weave, wherein the laminated layers portion is formed by a portion and a shape of a physical body of a seated person intended to support, wherein an opening margin of a laminated layers structure for inserting to enclose a cushioning member at inside of the laminated layers portion is continuously bulged to form at a portion of an outer periphery of the laminated layers portion, wherein the textile fabric is made to constitute a skin including one sheet of woven cloth by cutting a portion of the single layer portion by a predetermined shape passing a middle of a bulged portion of the opening margin and surrounding the laminated layers portion at other portion thereof, and wherein the seat pad is provided by inserting the cushioning member to inside of the laminated layers portion from an opening of the laminated layers portion formed by the opening margin. The opening of the laminated layers portion is sealed by providing an engaging member engaged with an engaging portion formed at a seating face of a seat constituting an object of mounting at a portion of an outer peripheral edge of the skin including the opening margin.

As still other one of the invention, there is a seat using an attachable and detachable type seat pad. According to a seat of the invention, a seating face of a seat having a cushion and a seat back is attachably and detachably mounted with the seat pad having an elasticity, wherein the seat pad is sewn by hollow weave and includes one sheet of woven cloth integrally and continuously having a single layer portion and a laminated layers portion in a shape of a hollow bag, and a cushioning member enclosed at an inner portion of the laminated layers portion and having a shape the same as a shape of the laminated layers portion and having an elasticity, and a surface side and a rear face side of the seat pad are constituted by shapes constituting a face symmetry relative to a middle face of the seat pad, and wherein a recessed portion constituting a shape the same as a shape of the laminated layers portion is formed at a position of the seating face of the seat facing the laminated layers portion.

At least a portion of an outer peripheral edge of the seat pad is provided with an engaging member, wherein also the seat is provided with an engaging portion capable of engaging with the engaging member of the seat pad, wherein the engaging portion is formed by a strip member laminated to the seating face of the seat, both end portions in a longitudinal direction thereof being bonded to the seat, and wherein the seat pad and the seat are attachably and detachably engaged with each other by inserting the engaging member of the seat pad to between the seat main body and the strip member. A middle portion of the strip member is not bonded to the seat member and the middle portion constitutes an inserting hole in a horizontal direction formed by the strip member and the seat main body.

The engaging portions are provided at a plurality of portions, and the respective engaging portions are disposed at the lower face of the seat pad when the seat pad is mounted to the seat, and wherein the engaging members of the seat pad are provided by a number and at positions in correspondence with a number and positions of the engaging portions of the seat. In a direction of a plane of the seat pad, pairs of the respective engaging portions and the respective engaging members are arranged at positions diagonal to or positions opposed to at least other pair of the engaging portion and the engaging member. Further, there is also a case of being the diagonal position, at the same time, also being the opposed position. Therefore, when a certain pair of the engaging portion and the engaging member are disposed at positions diagonal to at least one of other pairs of the engaging portions and the engaging members, a relationship with other pair of the engaging portion and the engaging member is not particularly limited. For example, there is also a case in which pairs of a plurality of the engaging portions and engaging members having short dimensions are disposed at positions diagonal to one pair of the engaging portion and the engaging member having the same long dimension.

The engaging member is provided at a front end of a flexible fabric member extended from an outer peripheral edge of the seat pad, and wherein a width dimension in a left and right direction of the engaging member is at least larger than an interval between both bonded portions of the strip member. The seat is provided with attaching means capable of being attached to attaching means provided at the seat pad. The attaching means is a snap button, wherein the snap button of the seat pad is provided by way of a fabric member in a shape of a flexible strip extended from a center in a thickness direction of an outer peripheral face of the seat pad, and wherein the fabric member for the snap button is provided with a stretchability.

Further, there is also the engaging portion including a slit formed by notching the seating face of the seat in a shape of a groove along an outer shape of the seat pad. By inserting the engaging member of the seat pad to the slit of the seat, the seat pad and the seat main body are attachably and detachably engaged with each other. Also the seat in this case is provided with attaching means attachable to attaching means provided at the seat pad.

According to the seat pad of the invention, the skin is sewn by the hollow weave having the single layer portion and the laminated layers portion in the shape of a hollow bag, and therefore, a plurality of sheets of the skins can be provided from one sheet of the textile fabric by only sewing the plurality of the skin shapes of the same pattern continuously at one sheet of the textile fabric and cutting successively the skin shapes to a predetermined shape, and a productivity thereof is high.

At this occasion, by only pertinently designing the woven shape of the textile fabric, the laminated layers portion can be constituted by the portion and the shape of the physical body of the seated person intended to support and a degree of freedom of design is high. Further, the cushioning member may only be enclosed into the laminated layers portion in the hollow bag shape, and therefore, there is dispensed with a seaming step of separately preparing two sheets of skins respectively and laminating the skins to head and tail faces of the cushioning member and seaming outer peripheral portions thereof, and therefore, production is made to be remarkably simple. When the seat pad can be attached to and detach from the seat, cleaning or interchange of the seat pad is easy.

By forming the recesses and projections of the same shape projecting laminated layers portion from the head and tail faces of the single layer portion at the head and tail faces of the seat pad, a reversible structure capable of using the both head and tails faces of the seat pad as the seating face can be constituted. By the reversible structure, it is prevented that only one face of the seat pad is damaged or deteriorated at an early stage and long life of the seat pad can be achieved. At this occasion, the skin is sewn by the hollow weave, and therefore, the design performance of the head and tail of the seat pad can easily be made to differ from each other without carrying out printing at a later stage by making the head and tail structures of the double weave by different colors or the like.

When the recessed portion of the same shape is formed at a position of the seating face of the seat facing the laminated layers portion of the seat pad and the laminated layers portion is made to be able to be mounted to the recessed portion of the seating face, positioning of the seat pad is facilitated. A height difference is spontaneously produced at the surface of the seat pad by a difference between the constitutions of the single layer portion and the laminated layers portion, and therefore, by only adequately utilizing the difference, a portion of the body of the seated person intended to support and a portion thereof not intended to support can freely and easily be designed.

By forming a plurality of pieces of the laminated layers portions at inside of the skin including one sheet of the woven cloth respectively independently from each other, while dividedly arranging the plurality of pieces of pad portions to precisely support the physical body of the seated person, one member (seat pad) can be constituted and therefore, the productivity is high and a number of parts can be reduced. Further, also the engaging means to the seat main body may be formed as one member, and also thereby, the productivity is high and the operation of attaching to and detaching from the seat main body is facilitated.

When the thickness of the laminated layers portion is set to be twice as much as the depth of the recessed portion of the seating face, in a case of mounting the seat back to the seat, although the rear face of the laminated layers portion and the bottom face of the recessed portion are brought into close contact with each other, the rear face of the single layer portion and the surface of the seat are not brought into close contact with each other. Therefore, while restraining an amount of projecting the seat pad from the seating face of the seat, the laminated layers portion can precisely be brought into contact with only the portion of the physical body of the seated person intended to support. On the other hand, the single layer portion is recessed by the predetermined amount from the surface of the laminated layers portion, and therefore, a constant gap is formed between the single layer portion and the physical body of the seated person. By the gap, heat or the like in a case in which the seated person is seated for a long period of time can be restrained.

When the locking piece locked by the engaging portion of the seat main body is provided at the front end of the flexible fabric member in the shape of the strip, a degree of freedom of a positional relationship of providing the engaging portion and the locking piece is high, and an operation of engaging the seat pad with the seat main body is facilitated. Further, in comparison with a face fastener, also the fixed position is easily specified.

When the seat pad is embedded with the core member for holding the shape, even the seat pad which cannot maintain a predetermined deformed state by having the elasticity as it is can maintain to hold the constant recessed and projected shape. For example, even the shape along the recessed and projected shape of the seat main body can be maintained to hold the shape.

According to the method of fabricating the seat pad of the invention, when the opening margin is formed to bulge continuously at a portion of the outer periphery of the laminated layers portion and the single layer portion is cut by the predetermined shape passing the middle portion of the bulged portion of the opening margin and surrounding the laminated layers portion at other portion thereof, it is not necessary to provide an opening for inserting the cushioning member at inside of the laminated layers portion purposely after cutting the skin, and a production efficiency is excellent.

At this occasion, by providing the engaging member at a portion of the outer periphery of the skin including the opening margin, also the opening can be sealed. That is, time and labor of sealing the opening of the laminated layers portion purposely by seaming or the like after inserting the cushioning member can be dispensed with.

According to the seat of the invention, when the strip member is laminated on the seating face of the seat main body and the engaging member of the seat pad is inserted between the coupling portions of the engaging portion, that is, the inserting hole, the fabric member of the engaging member is penetrated through the inserting hole of the coupling portion, the locking piece of the engaging member is brought into contact and locked by the coupling portion of the strip member on a side opposed to the direction of inserting the fabric member, thereby, the engaging member can be engaged so as not to be detached unpreparedly from the engaging portion. When the engaging member is intended to detach from the engaging portion, the engaging member may be drawn to be detached from the inserting hole of the engaging portion by releasing the locking piece and the strip member from being locked by each other. In this way, by only drawing and inserting the engaging member from and to the inserting hole of the engaging portion, the both members can be released from being engaged with each other, and therefore, the seat pad can easily be fixed to mount to the seat main body attachably and detachably.

When the engaging member of the seat pad is formed at the position opposed to the strip member constituting the engaging portion, thereafter, the strip member, that is, the engaging portion of the seat is provided at a lower face region of the seat pad, when mounting the seat pad to the seat main body, the engaging portion is disposed at the rear face of the seat pad, and the engaging member is engaged with the engaging portion in a state of being folded back to the rear face of the seat pad. Therefore, the portion of engaging the seat pad and the seat main body can be covered to conceal by the seat pad, and therefore, an outlook of the seat can be made to be excellent. At this occasion, when pluralities of pieces of the engaging members and the engaging portions are provided, the seat pad can firmly be fixed to the seat main body. Further, when a pair of the engaging portion and the engaging member is arranged at a position diagonal to or a position opposed to at least other pair of the engaging portion and the engaging member in a region of a plane shape of the seat pad, loads of fixing the seat pad from a peripheral direction can be made to be uniform, and therefore, the seat pad can be mounted to fix to the seat main body without floating up or wrinkling a portion of the seat pad, and the outlook and the seating comfort are not deteriorated.

When the width dimension in the left and right direction of the locking piece is made to be larger than at least the interval between the two coupling portions of the strip member coupled to the seat main body, that is, the width dimension in the left and right direction of the inserting hole, by catching the both ends of the engaging member inserted to the inserting hole by the coupling portion of the strip member, the engaging member can be hampered from being drawn to detach. Therefore, it is not necessary to form the locking piece by a special shape of, for example, a shape of a hook, and therefore, the thickness can be thinned. Thereby, even when engaged by the rear face of the seat pad, the seat pad is not bulged and the outlook of the seat is not deteriorated. Also by such a simple constitution, the locking piece once inserted to be locked is not unpreparedly drawn to detach from the engaging portion, and therefore, the seat pad can easily and firmly be mounted to the seat main body.

Also by constituting the engaging portion by the slit notched to be formed in the shape of the groove and inserting the engaging member to be fitted to the slit, the seat pad can easily and firmly be mounted to the seat main body. At this occasion, when the slit is formed in line with a portion of the outer shape of the seat pad, the seat pad can be fixed to the seat efficiently and with an excellent outlook.

When the attaching means for making the seat pad in line with the surface shape of the seat is provided, the recessed and projected shape of the seat can firmly be realized by the flat seat pad without providing the recessed and projected shape at the seat pad per se.

When the snap button is used as the attaching means, attachment of the seat pad and the seat is simple. When the button on the side of the seat pad is provided by way of the flexible fabric member in the strip-like shape, the button can be made to be adapted precisely to the position of arranging the button on the side of the seat main body. In this case, although the seat pad is provided with the attaching means including the fabric member and the snap button in addition to the engaging member, also the attaching means is arranged at the center in the thickness direction of the seat pad, and therefore, the reversible function of the seat pad is not hampered. Further, the fabric member for the snap button is provided with a stretchability, by attaching the fabric member by the snap button in the extended state, a state of urging an urge force always to the side of the seat main body to the core member embedded in the seat back can be constituted, and a performance of following the surface shape of the seat main body of the seat pad can be promoted.

BEST MODE FOR CARRYING OUT THE INVENTION

Although embodiments of the invention will be explained as follows, the invention is not limited thereto but can be changed variously within a range without changing the gist of the invention. Although a seat pad of the invention is not limited to those of various kinds of vehicles of an automobile, a railway train and the like but is widely applicable to a seat for a ship or an aeroplane, an explanation will be given as follows by taking examples of embodiments applied to a seat for an automobile.

Embodiment 1

Figure 1:
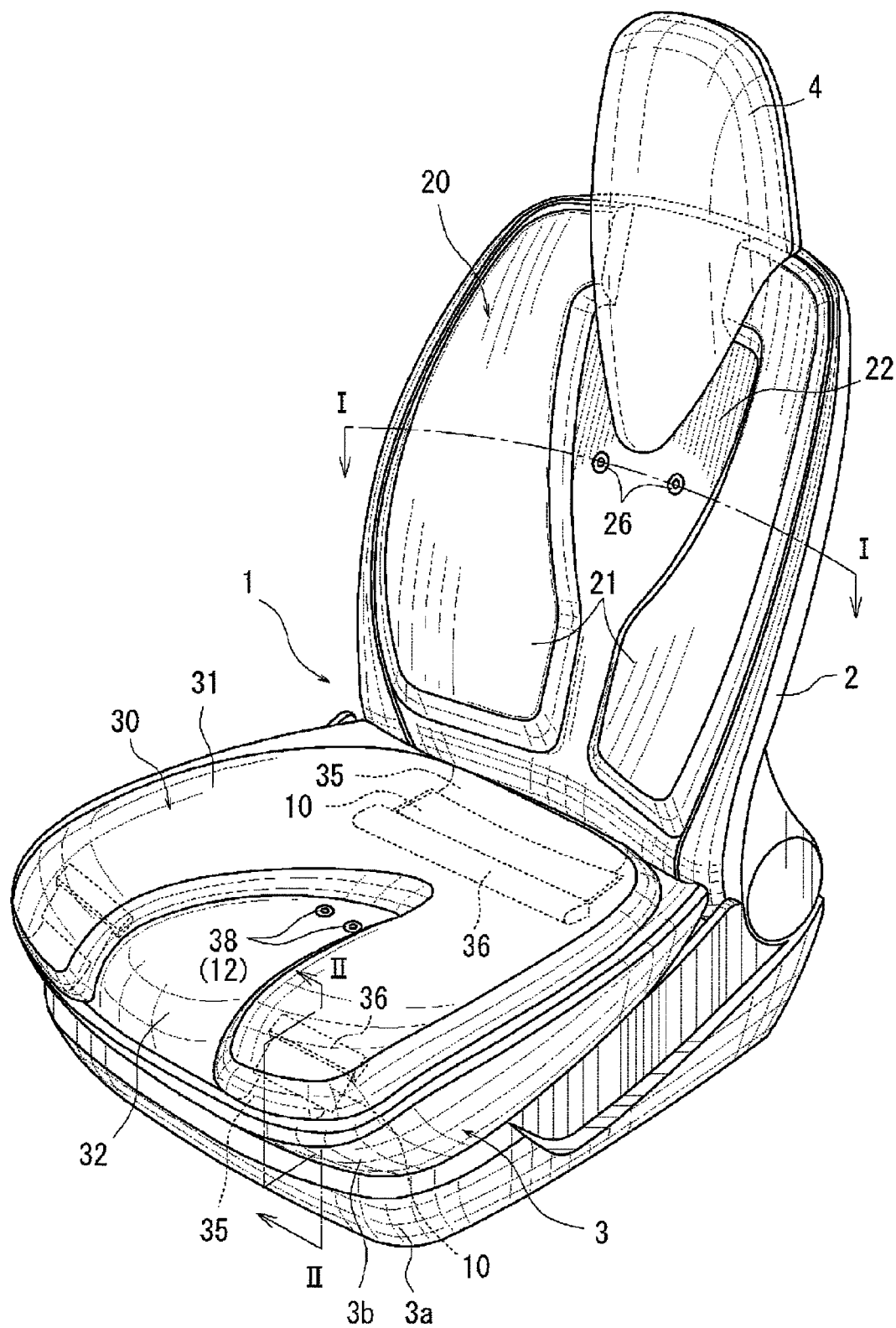
FIG. 1 is a perspective view of a seat mounted with a seat pad of Embodiment 1.
Figure 2:
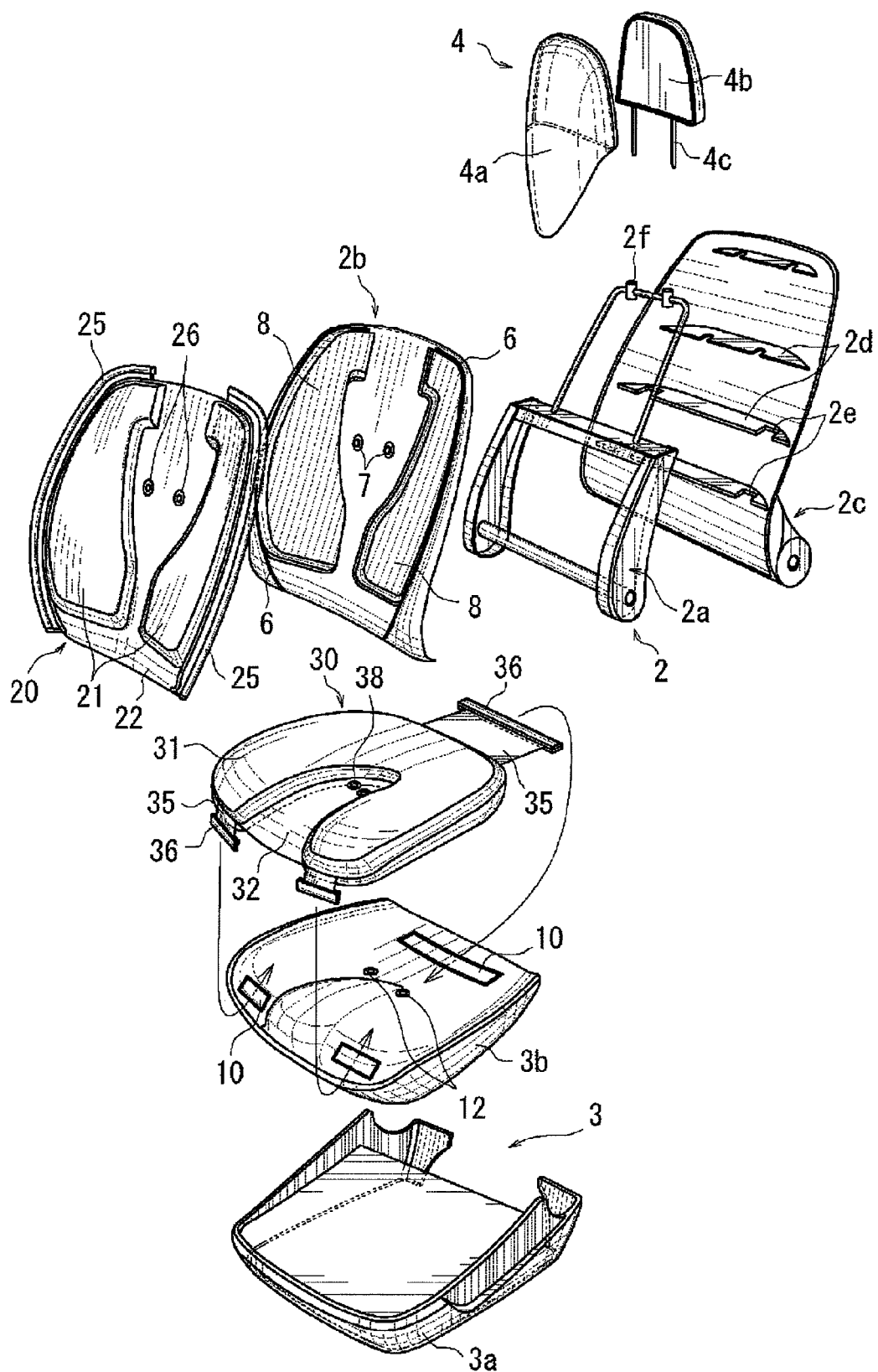
FIG. 2 is a disassembled perspective view of a seat main body and a seat pad of Embodiment 1.

As shown by FIG. 1, a seat main body 1 includes a seat back 2 and a seat cushion 3 and a head rest 4. As shown by FIG. 2, the seat back 2 includes an inner frame 2a, and a front face panel 2b and a rear face panel 2c squeezing the inner frame 2a from a front and a rear direction. A front face of the front face panel 2b is attachably and detachably mounted with a back pad 20 as a seat pad for the seat back 2. The inner frame 2a, the front face panel 2b, and the rear face panel 2c are synthetic resin molded products. A front face of the rear face panel 2c is integrally formed with a plurality of steps of ribs 2d in an up and down direction. When the inner frame 2a is squeezed by the front face panel 2b and the rear face panel 2c, the inner frame 2a is contained in a plurality of recesses 2e notched to be formed at predetermined portions of the respective ribs 2d of the rear face panel 2c. Further, an illustration of a small member or mechanism of a reclining mechanism of the seat main body 1 or the like is omitted. The seat cushion 3 includes a cushion frame 3a made of a synthetic resin, and a cushion base 3b mounted to be fixed onto the cushion frame 3a. The cushion base 3b includes a comparatively hard foamed member of urethane foam or the like. An upper face of the cushion base 3b is attachably and detachably mounted with a cushion pad 30 as a seat pad for the seat cushion 3. The head rest 4 includes a head cushion 4a supporting the head portion of a seated person by a front face thereof, a rear face panel 4b made of a synthetic resin, and two left and right pieces of guide rods 4c extended from a lower side of the rear face panel 4b. By inserting the left and right guide rods 4c to guide holes 2f formed at two left and right portions of an upper portion of the inner frame 2a of the seat back 2, the guide rods 4c are mounted to the seat back 2 slidably in the up and down direction.

Figure 3:
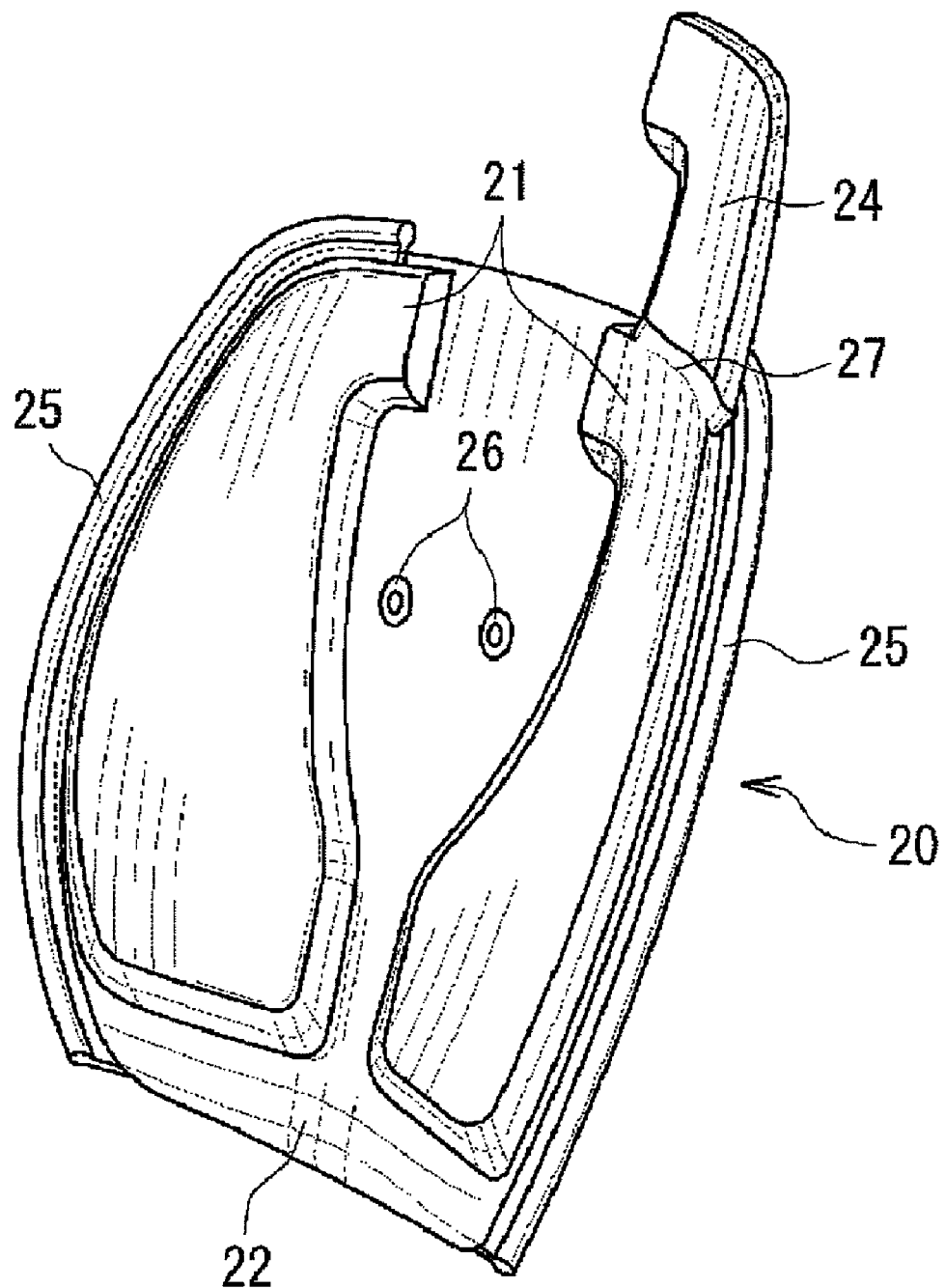
FIG. 3 is a perspective view showing a state of inserting a cushioning member to a back pad of Embodiment 1.

First, an explanation will be given of the back pad 20 capable of being attachably and detachably mounted to the seat back 2 of the seat main body 1. As shown by FIG. 2 and FIG. 3, the back pad 20 is constituted to support a surrounding of the shoulder blades excluding the backbone portion and the waist portion of the seated person. The back pad 20 is made to constitute one member in which two laminated layers portions 21•21, having both head and tail faces of the same shape, are dividedly arranged symmetrically in a left and right direction, and a remaining portion is surrounded and connected by a single layer portion 22. Specifically, a skin 23 including one sheet of woven cloth integrally and continuously having the single layer portion 22 and the two laminated layers portions 21 in a shape of a hollow bag is formed by a size and a shape to cover a total seating face of the seat back 2 by hollow weave (refer to FIG. 4). Further, there is constructed a constitution of respectively enclosing cushioning members 24 having a shape substantially the same as that of the laminated layers portion 21 and having an elasticity to inner portions of the two laminated layers portions 21. The single layer portion 22 is knitted with head and tail fiber structures of the laminated layers portion 21 as one sheet of cloth and present to surround a total of outer peripheries of the two laminated layers portions 21.

The two laminated layers portions 21 are provided with constant thicknesses by the cushioning members 24, a surface and a rear face of the back pad 20 are formed with recesses and projections of the same shape projecting the two laminated layers portions 21 from the surface and the rear face of the single layer portion 22 by the same amount, and a side of the surface and a side of the rear face show a shape constituting a face symmetry relative to a middle face. Therefore, when the back pad 20 is mounted to the seat back 2, the two laminated layers portions 21 are mainly brought into contact with the back face of the seated person. Thereby, the two laminated layers portions 21 constitute supporting portions for supporting the physical body of the seated person. The single layer portion 22 is not brought into close contact with the physical body of the seated person but substantially constitutes a nonsupporting portion. That is, in the back pad 20 including one member, a plurality of pieces of the laminated layers portions 21 constituting the supporting portions are formed in a divided state in portions and shapes of the physical body of the seated person intended to support. Thereby, the plurality of pieces of supporting members formed into divided pieces thereof are made to be able to be mounted to the seat main body 1 by one time mounting operation.

The back pad 20 is provided with resin rails 25 engageable with a slit 6 formed at the seat back 2 mentioned later from both left and right shoulder portions over to both left and right side lower portions. The resin rail corresponds to an engaging member of the invention. The left and right engaging members 25 are provided by utilizing an outer peripheral edge of the skin 23. That is, an outer peripheral end of the single layer portion 22 surrounding outer sides of the laminated layers portions 21 is provided with two of the resin rails 25 having long dimensions constituting the engaging member. Therefore, at the back pad 20, the single layer portion 22, like a flange on the outer sides of the laminated layers portions 21, corresponds to a fabric member of the invention. According thereto, a necessity of separately preparing a fabric member for providing the resin rail 25 purposely after sewing the skin 23, and time and labor of bonding the fabric member can be dispensed with. By providing the resin rails 25 at left and right outer peripheral edges of the skin 23, processing of terminals of the skin 23 at portions of installing the two resin rails 25 can be dispensed with. Further, both head and tail faces of the single layer portion 22 between the left and right laminated layers portions 21•21 of the back pad 20 are provided with two of left and right female buttons 26 of snap buttons as attaching means constituting pairs with male buttons 7 of snap buttons as the attaching means provided at the seat back 2 mentioned later.

According to the back pad 20, the laminated layers portions 21 and the single layer portions 22 are constituted by the same shapes at both head and tail faces thereof, engaging members (resin rails 25) and attaching means (female buttons 26) are respectively provided at the single layer portion 22, and therefore, the engaging members and the attaching means are respectively provided at a center position in a thickness direction of the laminated layers portion 21. By constituting as described above, the back pad 20 is constituted by a reversible structure respectively capable of using the both head and tail faces. By effectively utilizing the reversible function, color patterns of the head and tail faces of the laminated layers portion 21 of the skin 23 are changed. Further, by constituting the snap button on a side of the back pad 20 by the female button 26, a stimulus to the seated person is made to be reduced as less as possible even when the back of the seated person is assumedly brought into contact with the snap button.

Figure 4:
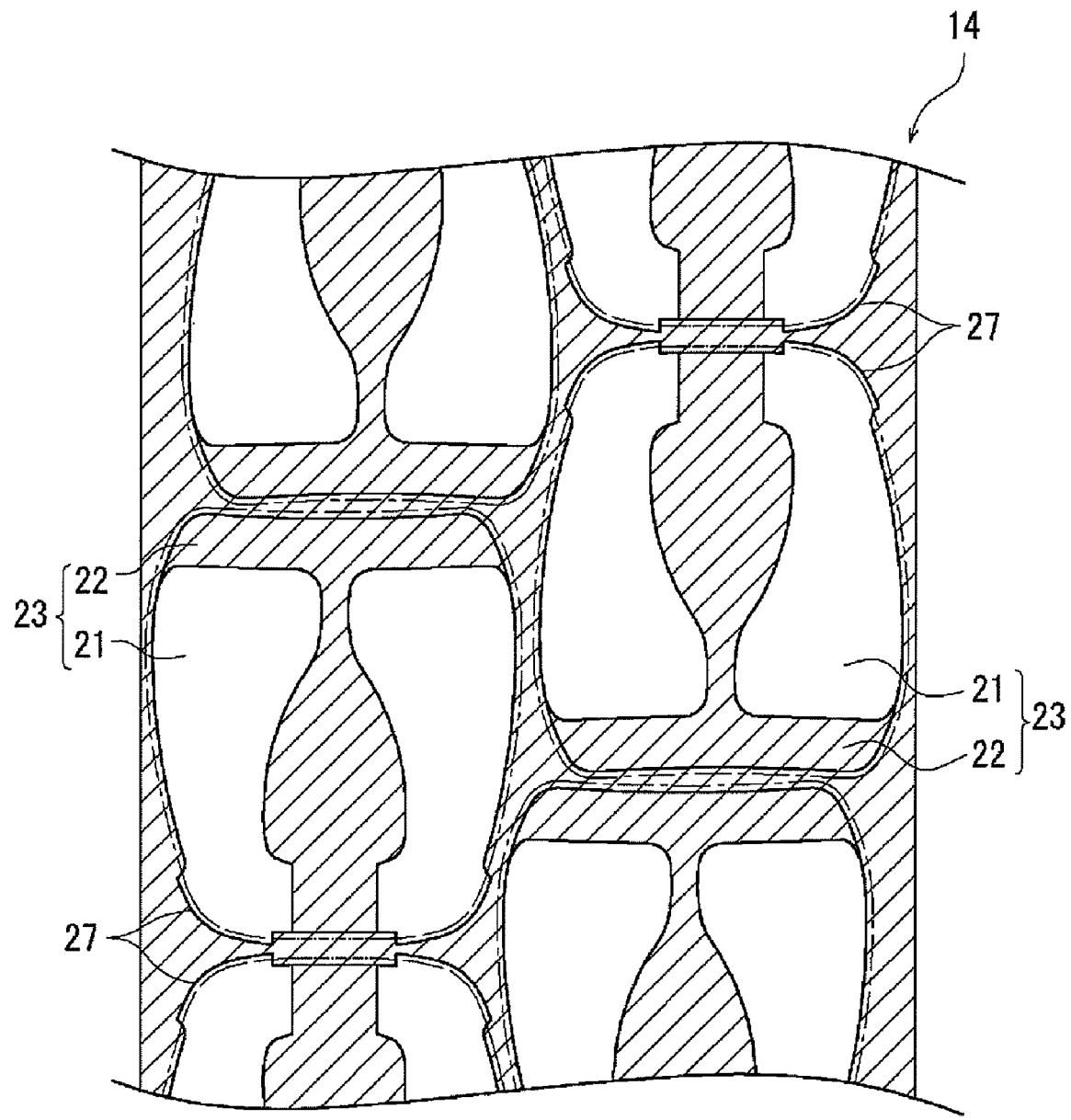
FIG. 4 is a plane view showing a pattern of sewing a skin of the back pad of Embodiment 1.

Next, a method of fabricating the back pad 20 will be explained. First, as shown by FIG. 4, a textile fabric 14 continuously having the laminated layers portions 21 and the single layer portions 22 of the same patterns is woven by hollow weave to include the left and right laminated layers portions 21 in correspondence with portions and shapes of the physical body of the seated person intended to support. Successively, by cutting the textile fabric 14 by cutting lines indicated by one-dotted chain lines of FIG. 4, a number of sheets of the skins 23 having the same shape can be provided from one sheet of the textile fabric 14. At this occasion, shoulder portions of outer peripheries of the left and right laminated layers portions 21 are bulged to be formed continuously with opening margins 27 for forming openings for inserting the cushioning members 24 into the two laminated layers portions 21. By cutting the textile fabric 14 to pass a middle of the bulge of the opening margin 27, openings are formed at portions of the two laminated layers portions 21 at the provided skin 23.

Successively, as shown by FIG. 3, the cushioning members 24 formed by shapes substantially the same as those of the two laminated layers portions 21 are inserted from the openings formed at portions of the opening margins 27. As the cushioning members 24, molded products of foamed members having an elasticity of urethane foam or the like can be used and in being inserted to the respective laminated layers portions 21, the cushioning members 24 are previously molded by a predetermined shape inside by a forming die. Further, the two laminated layers portions 21 of the skin 23 are provided with more or less stretchability by the plain weave structure. Therefore, when the respective cushioning members 24 are formed one size larger than the two laminated layers portions 21, by a synergic effect with the elasticity of the cushioning member 24, the respective cushioning members 24 can be packed into the two laminated layers portions 21 in a significantly stretchable state. On the other hand, the single layer portion 22 is hardly provided with the stretchability by a structure of weaving warp and weft at head and tail portions thereof.

Figure 5:
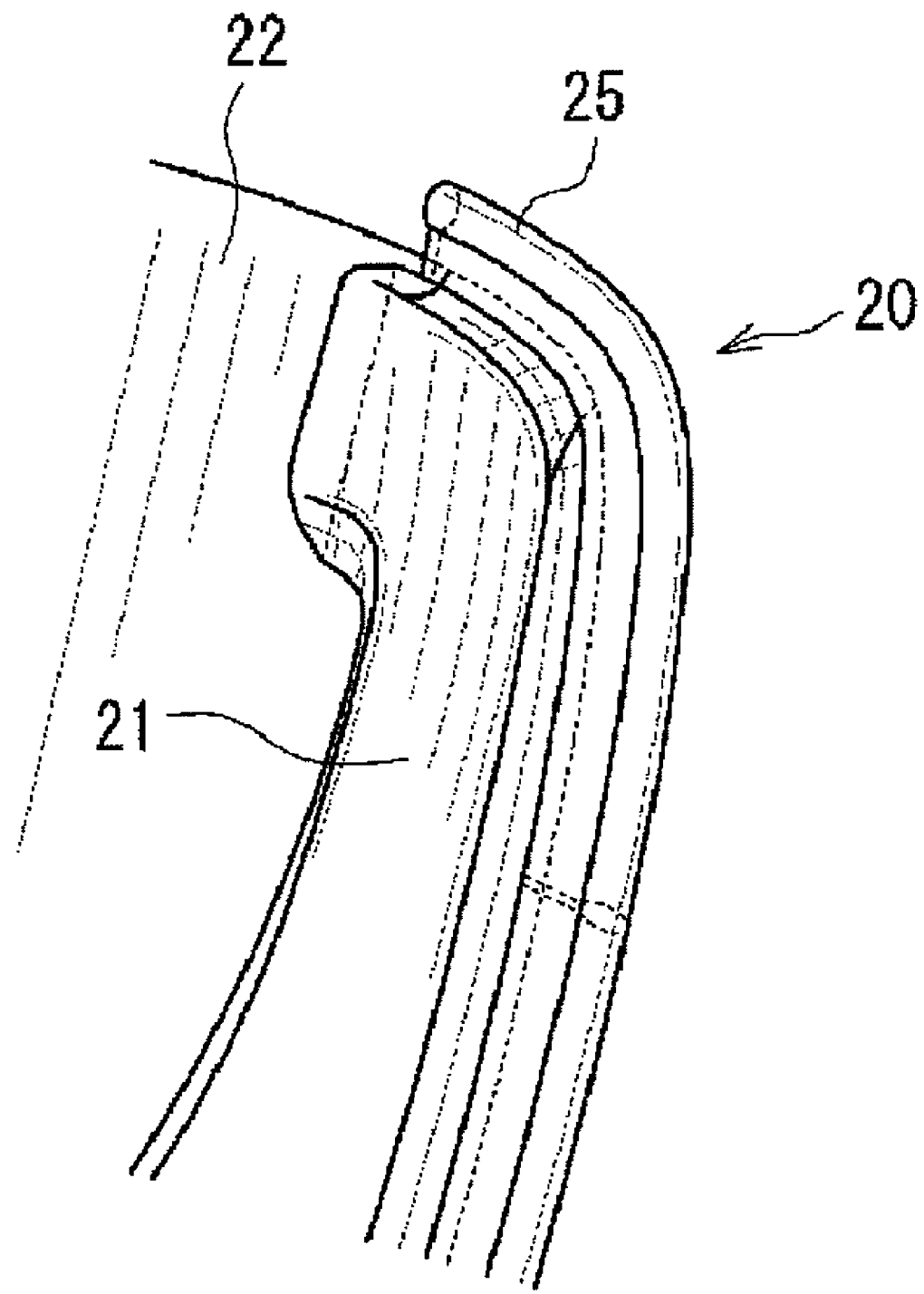
FIG. 5 is a view enlarging an essential portion of the back pad of Embodiment 1

When the respective cushioning members 24 can be completely inserted into the two laminated layers portions 21, the resin rail 25 as the engaging member is fixed to the outer peripheral edge of the skin 23 from the shoulder portions of the back pad 20 including the openings of the two laminated layers portions 21 over to both left and right side lower portions. Specifically, a synthetic resin is molded into the predetermined shape from the shoulder portions over to both left and right side lower portions of the back pad 20 by a well-known method of injection molding or the like. A side of a fixed base end of the resin rail 25 is formed with a groove over a longitudinal direction thereof. The fixed base end of the resin rail 25 is thermally pressed to squeeze in a state of inserting the outer peripheral end of the skin 23 of the back pad 20 to the groove of the resin rail 25. Thereby, the resin rail 25 can be fixed to the skin 23. As is well shown in FIG. 5, by providing the resin rail 25 including the outer peripheral end of the opening margin 27, a processing of opening the openings of the both laminated layers portions 21 can also be carried out. The outer peripheral end of the back pad 20 other than the portion of providing the resin rail 25 may be processed with a cutting small port by a well-known terminal processing of sewing or the like.

Finally, by fixing the female buttons 26 of the snap buttons as the attaching means at predetermined head and tail portions of the single layer portion 22 between the left and right laminated layers portions 21·21 by sewing or adhering, the back pad 20 can be provided.

Figure 7:
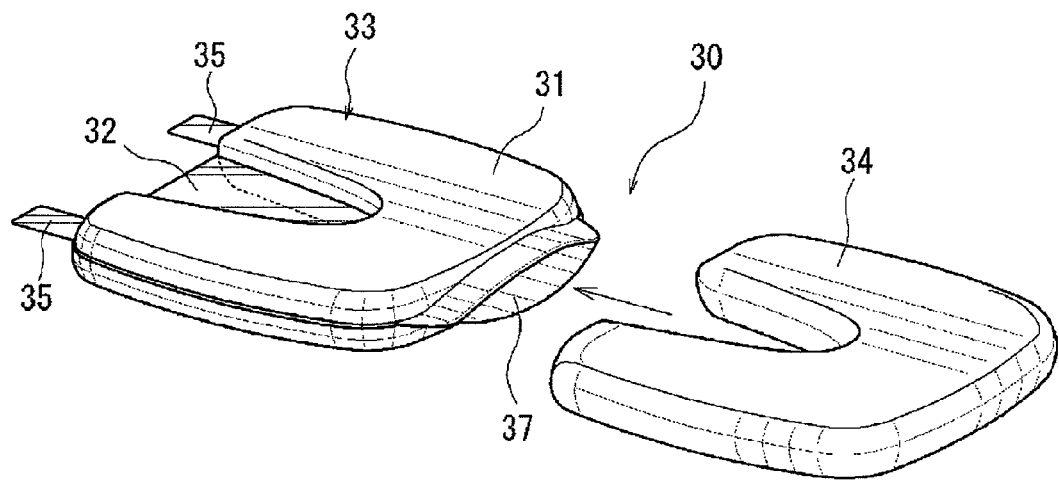
FIG. 7 is a perspective view showing a step of inserting a cushioning member to the cushion pad of Embodiment 1.

Next, an explanation will be given of the cushion pad 30 capability of being attachably and detachably mounted to the seat cushion 3 of the seat main body 1. As shown by FIG. 1 and FIG. 7, the cushion pad 30 is integrally and continuously provided with one laminated layers portion 31 in a shape of a hollow bag formed substantially in a U-like shape in a plane view thereof having both head and tail faces of the same shape, and a single layer portion 32 surrounding an outer periphery of the laminated layers portion 31 by weaving a skin 33 by hollow weave by a size and a shape of covering a total of a seating face of the seat cushion 3. An inner portion of the laminated layers portion 31 is enclosed with a cushioning member 34 constituting a molded product of a foamed member having elasticity in a shape substantially the same as that of the laminated layers portion 31, and a surface side and a rear face side thereof show shapes constituting face symmetry relative to a middle face.

The laminated layers portion 31 is provided with a constant thickness by the cushioning member 34, and a surface and a rear face of the cushion pad 30 are formed with recesses and projections of the same shape that project the laminated layers portion 31 from head and tail faces of the single layer portion 32 by the same amount. Thereby, it is designed such that when the cushion pad 30 is mounted to the seat cushion 3, a bifurcated base end portion in a U shape supports the hip portion of the seated person and two left and right pieces of bifurcated front end portions in a U shape support the thigh portions of the seated person respectively. The laminated layers portion 31 constitutes a supporting portion mainly supporting the physical body of the seated person, the single layer portion 32 is not brought into close contact with the physical body of the seated person and constitutes substantially a nonsupporting portion. That is, the laminated layers portion 31 constituting the supporting portion is formed by a portion and a shape of the physical body of the seated person intended to support.

Further, an outer peripheral edge of the cushion pad 30 is provided with resin clips 36 of thin plates as engaging members for attachably and detachably mounting to the seat cushion 3 at two left and right portions on a front side and at one portion of a center portion in a left and right direction of a rear side. The resin clip 36 is fixed to a front end of a flexible and nonstretchable fabric belt 35 extended from an outer peripheral edge of the cushion pad 30. A base end of the fabric belt 35 is connected to a center portion in a thickness direction of the cushion pad 30. A width dimension in the left and right direction of the fabric belts 35 is set to a size substantially over a width in the left and right direction of portions of the laminated layers portion 31 to which the fabric belts 35 are sewn, and the width dimension in the left and right direction of the resin clip 36 on a front side is smaller than that of the resin clip 36 on a rear side. Further, the two resin clips 36 on the front side are disposed at positions diagonal to the resin clip 36 on the rear side respectively in a region of a plane shape of the laminated layers portion 31. Both head and tail faces of the single layer portion 32 surrounded by the laminated layers portion 31 of the cushion pad 30 are provided with female buttons 38 of snap buttons as attaching means to be in line with a shape of a surface of the seat cushion 3 when the cushion pad 30 is mounted to the seat cushion 3.

According to the cushion pad 30, the laminated layers portion 31 and the single layer portion 32 are constituted by the same shapes at both head and tail faces, the engaging members are arranged at the center in the thickness direction of the laminated layers portion 31, the attaching means (female buttons 38) are provided at the single layer portion 32, and therefore, also the attaching means are disposed at the center position in the thickness direction of the laminated layers portion 31. By constituting as described above, the cushion pad 30 is constituted by a reversible structure capable of using the both head and tail faces. By effectively utilizing the reversible function, color patterns of head and tail faces are changed at the laminated layers portion 31 of the skin 33. Further, by constituting the snap button on a side of the cushion pad 30 by the female button 38, even when the thigh of the seated person or the like is assumedly brought into contact with the snap button, a stimulus to the seated person is made to be able to be reduced as less as possible.

Figure 6:
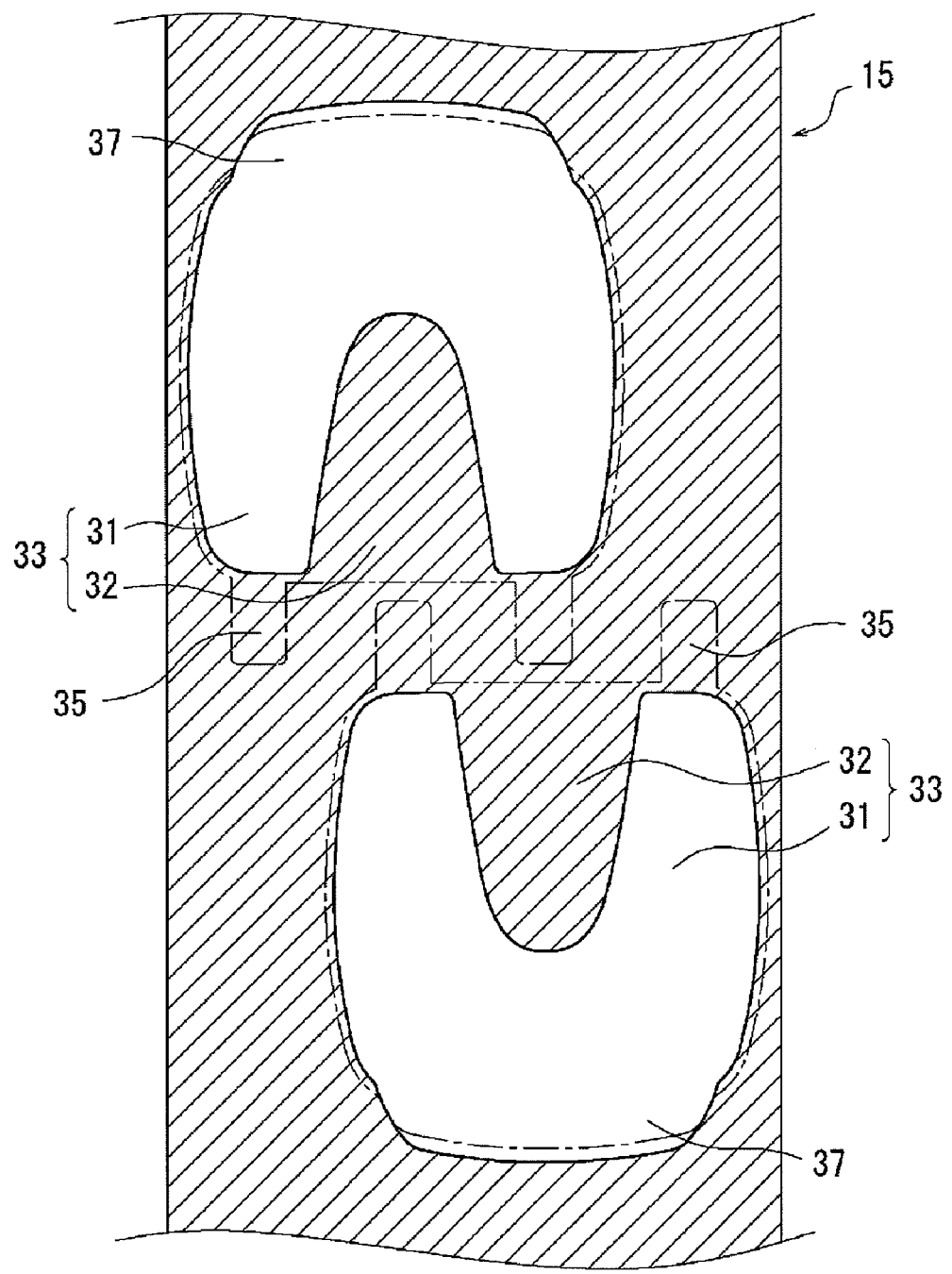
FIG. 6 is a plane view showing a pattern of sewing a skin of a cushion pad of Embodiment 1.

Next, an explanation will be given of a method of fabricating the cushion pad 30 constituting the seat pad of Embodiment 1. As shown by FIG. 6, a textile fabric 15 integrally and continuously having the laminated layers portions 31 and the single layer portions 32 of the same pattern is sewn by hollow weave to include a plurality of the laminated layers portions 31 in correspondence with a portion and a shape of the physical body of the seated person intended to support. Successively, by cutting the textile fabric 15 by cutting lines indicated by one-dotted chain lines of FIG. 6, a number of sheets of the skin 33 having the same shape can be provided from one sheet of the textile fabric. At this occasion, at a rear portion of the laminated layers portion 31, an opening margin 37 is formed to bulge continuous to a basic shape of the laminated layers portion 31. By cutting the textile fabric 15 to pass a middle of the bulged portion of the opening margin 37, an opening is formed at the laminated layers portion 31 of the provided skin 33. The cushioning member 34 is inserted into the laminated layers portion 31 from the opening.

Successively, as shown by FIG. 7, the cushioning member 34 formed by a shape substantially the same as that of the laminated layers portion 31 is inserted from the opening formed at the portion of the opening margin 37. A molded product of a foamed member having an elasticity of urethane foam or the like which is more flexible than the cushion base 3b can be used for the cushioning member 34, and in being inserted to the laminated layers portion 31, the cushioning member 34 is previously molded by a predetermined shape inside by a forming die. Further, the laminated layers portion 31 of the skin 33 is provided with more or less stretchability by a plain weave structure. Therefore, when the cushioning member 34 is formed to be one size larger than the laminated layers portion 31, by a synergic effect with the elasticity of the cushioning member 34, the cushioning member 34 can be packed into the laminated layers portion 31 in a significantly stretchable state. On the other hand, the single layer portion 32 is hardly provided with a stretchability owing to a structure of weaving warp and weft at head and tail portions thereof.

Figure 8:
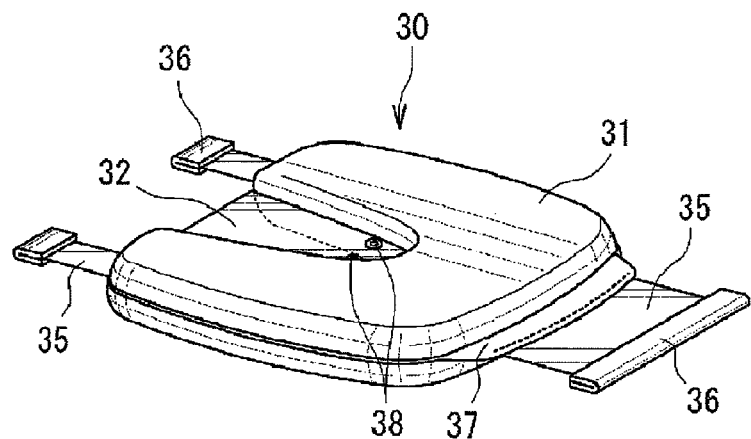
FIG. 8 is a perspective view of the cushion pad of Embodiment 1.

When the cushioning member 34 is made to be able to be completely inserted into the laminated layers portion 31, as shown by FIG. 8, one end of the nonstretchable fabric belt 35 is squeezed between the upper and lower opening margins 37 to be sewn. Thereby, sealing of the opening of the laminated layers portion 31 and attaching of the fabric belt 35 can simultaneously be carried out. Further, although it is preferable to previously fix the resin clip 36 provided at other end of the fabric belt 35 before attaching the fabric belt 35 to the cushion pad 30, the resin clip 36 may also be fixed after attaching the fabric belt 35 to the cushion pad 30.

Further, the single layer portion 32 of the skin 33 is utilized as it is for the fabric belts 35 provided at the two left and right portions on the front side of the cushion pad 30. Specifically, the textile fabric 15 of the skin 33 is cut by a shape integrally and continuously having the fabric belts 35 as shown by FIG. 6. Thereby, as shown by FIG. 7, two pieces of the fabric belts 35 can be provided in a state of being previously formed integrally at the two left and right portions on the front side of the cushion pad 30. Further, the resin clips 36 may be fixed to the both fabric belts 35 on the front side before or after an operation of sewing the fabric belt 35 on the rear side.

As a method of fixing the resin clip 36, the resin clip 36 in a shape of a thin plate is molded by a well-known method of injection molding or the like. A fixing base end of the resin clip 36 is formed with a groove over in a longitudinal direction. Further, in a state of inserting the front end of the fabric belt 35 to the groove of the resin clip 36, by thermally pressing to squeeze the fixing base end of the resin clip 36, the resin clip 36 can be fixed to the fabric belt 35. In this way, by directly fixing the respective resin clips 36 to an outer peripheral end of the skin 33 of the cushion pad 30, a processing of a terminal of the skin 33 can be dispensed with at a portion of the resin clip 36. Further, by sewing the fabric belt 35 to the portion of the opening margin 37, a processing of a terminal end of the portion of the opening margin 37 can also be carried out. It is preferable that at other than portions of providing the two resin clips 36 on the front side and a portion of sewing the fabric belt 35 on the rear side of the outer peripheral end of the cushion pad 30, a cutting small port is processed by a well-known terminal processing of sewing or the like, and the single layer portion 32 surrounding an outer periphery of the laminated layers portion 31 is constituted by a dimension as short as possible. Finally, by fixing the female buttons 38 as the attaching means at predetermined head and tail portions of the single layer portion 32 by sewing or adhering, the cushion pad 30 can be provided.

Figure 9:
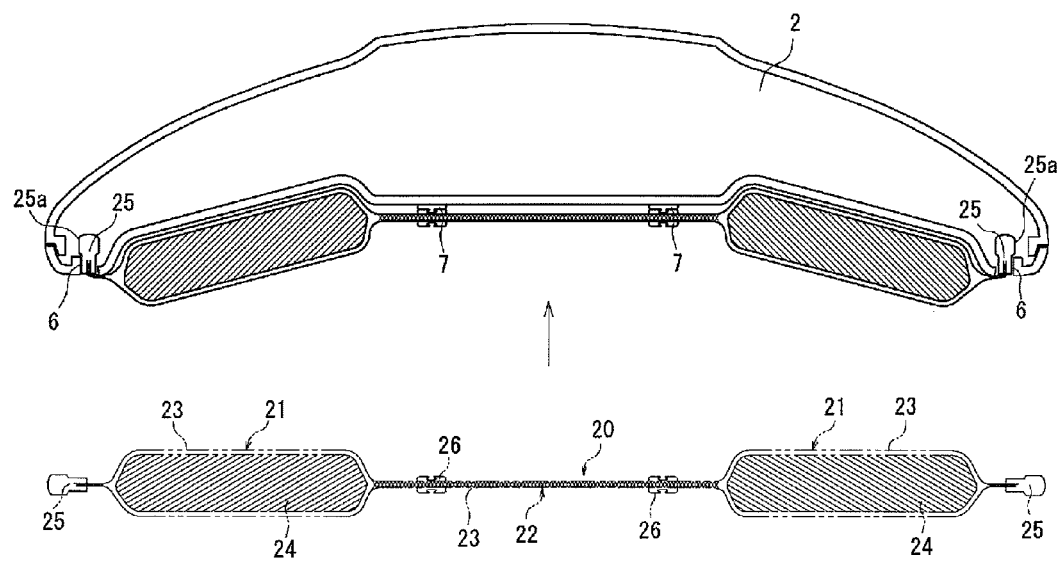
FIG. 9 is a sectional view taken along a line I-I of FIG. 1.

Next, a structure of attaching and detaching the back pad 20 and the cushion pad 30 to and from the seat main body 1 will be explained. As shown by FIG. 2, the seating face of the seat back 2 is formed with a slit 6 notched to be formed in a groove-like shape at a position in correspondence with the resin rails 25 of the back pad 20 from shoulder portions over to both left and right side end lower portions along an outer shape of the back pad 20. The slit 6 corresponds to an engaging portion of the invention. Further, the seating face of the seat back 2 is adhered to be fixed with the male button 7 constituting the snap button as attaching means at a portion thereof facing the female button 26 of the back pad 20. Further, the seating face of the seat back 2 is formed with a recess portion 8 having a shape substantially the same as that of the laminated layers portion 21 of the back pad 20 to be recessed to the rear side. Because of the recessed portion 8, when the back pad 20 is mounted the seat back 2, the laminated layers portion 21 of the back pad 20 is restrained from being excessively projected to the front side, and a positional shift of the back pad 20 in positioning or in an up and down direction or in a left and right direction can be prevented. As shown by FIG. 9, a thickness of the laminated layers portion 21 is set to a dimension twice as much as a depth of the recessed portion 8, in other words, the recessed portion 8 is set to a depth of about a half of the laminated layers portion 21, and a center in the left and right direction is inclined to the rear side to be able to efficiently support the seated person by the laminated layers portion 21.

In mounting the back pad 20 to the seat back 2, in a state of detaching the head rest 4 from the seat back 2, as shown by FIG. 9, mounting is facilitated by inserting to fit the resin rail 25 of the back pad 20 to the slit 6 provided at the seating face of the seat back 2. The resin rail 25 inserted to the slit 6 is restricted from being drawn to detach unpreparedly by locking a thick-walled portion 25a at a front end thereof by an inner peripheral edge of the slit 6. Now, the center portion in the left and right direction of the back pad 20 is brought into a state of being floated up from the seating face of the seat back 2. Here, the female buttons 26 of the back pad 20 and the male buttons 7 of the seat back 2 are fitted to each other. Thereby, the back pad 20 can precisely be in line with a shape of the seating face of the seat back 2 by bringing a rear face of the laminated layers portion 21 and a depth face of the recessed portion 8 into close contact with each other and making a rear face of the single layer portion 22 and a front face of the seat back 2 proximate to each other when the back pad 20 is mounted to the seat back 2. Further, in FIG. 9, illustration of a member at an inner portion of the seat back 2 such as the inner frame 2a or the like is omitted.

Thereafter, the head rest 4 may be attached to the seat back 2. At this occasion, as shown by FIG. 1, the resin rail 25 of the back pad 20, and an upper side front end of the slit 6 of the seat back 2 are disposed on the rear side of the head rest 4 to be covered and concealed thereby. Further, when the cushion pad 30 is mounted to the seat cushion 3, a lower end of the back pad 20 is concealed by the cushion pad 30. Therefore, a portion of the outer peripheral end of the back pad 20 which is not provided with the resin rail 25 may not necessarily be subjected to a terminal processing of sewing or the like. In detaching the back pad 20 from the seat back 2 for reversing head and tail of the seating face or cleaning the seating face, in a state of detaching the head rest 4 from the seat back 2, the back pad 20 may only be pulled in a direction of being remote from the seat back 2.

Engaging portions engaging with the respective resin clips 36 of the cushion pad 30 are formed at positions of the seating face of the seat cushion 3 in correspondence with portions of the seating face of the seat cushion 3 provided with the resin clips 36 of the cushion pad 30. The engaging portions are formed at two front left and right portions and at one rear center portion of the cushion base 3b. Therefore, also the two front engaging portions are respectively brought into a relationship of being diagonal to the rear engaging portion in a region of a plane shape of the cushion pad 30. The respective engaging portions are constituted by laminating fabric-made strip members 10 laterally prolonged in the left and right direction on the seating face of the seat cushion 3, folding back two end portions in a longitudinal direction thereof, thereafter, sewing the strip members to the seat cushion 3. Thereby, there are formed inserting holes 11 in a plane direction surrounded by the strip members 10 and the seat cushion 3 capable of inserting the resin clips 36 of the cushion pad 30 at middle portions in longitudinal directions of the respective strip members 10. A width dimension in the left and right direction of the strip member 10 is set to be the same as that of the resin clip 36. Therefore, a width dimension in the left and right direction of the resin clip 36 is larger than an interval between two left and right seaming portions 13, 13 of the strip member 10, that is, a width dimension of the inserting hole 11. The respective strip members 10 are arranged at a region of a lower face (rear face) of the cushion pad 30 in a state of mounting the cushion pad 30 to the cushion base 3b. Further, male buttons 12•12 of snap buttons as attaching means are fixed at positions in correspondence with the female buttons 38 as the attaching means of the cushion pad 30.

Figure 10:
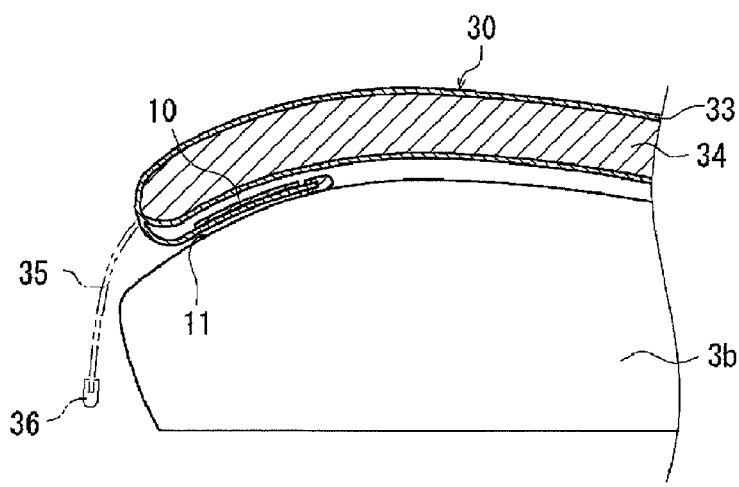
FIG. 10 is a sectional view taken along a line II-II of FIG. 1.
Figure 11:
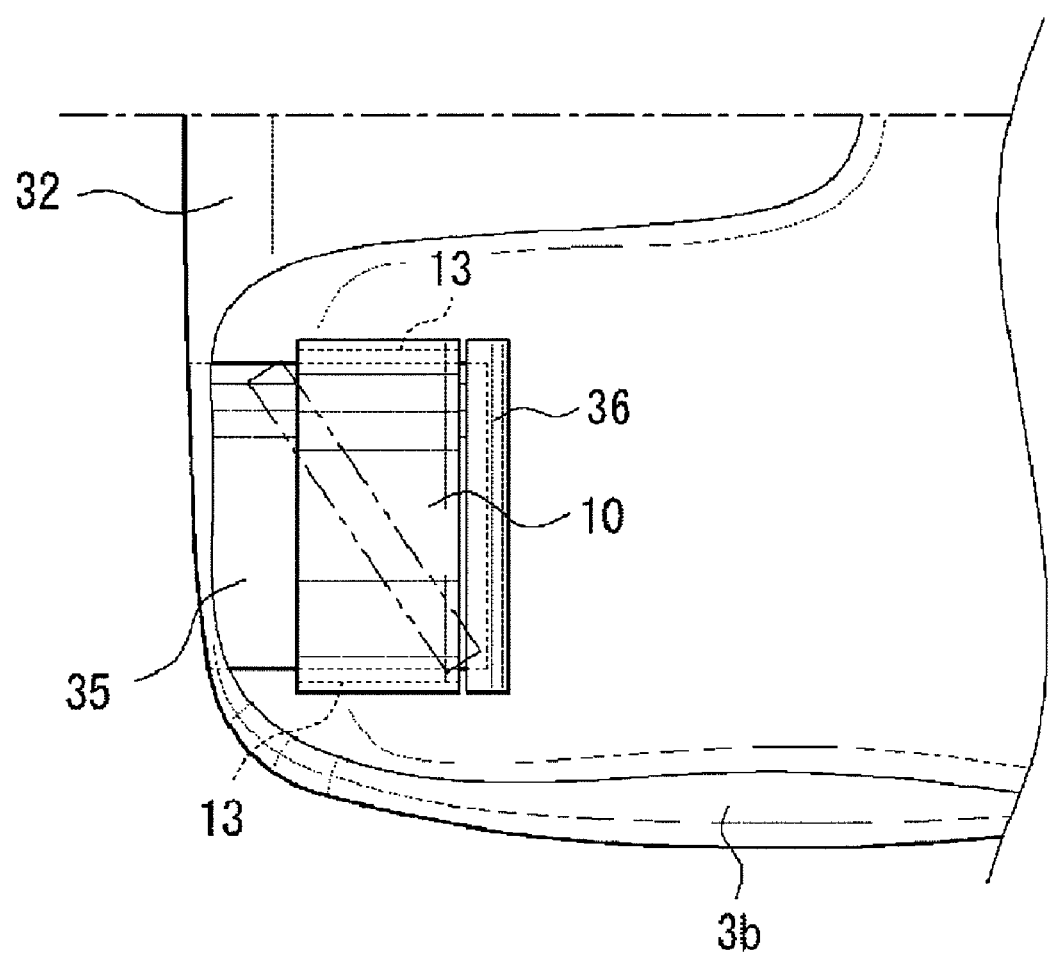
FIG. 11 is a plane view enlarging an essential portion of a portion of engaging a seat cushion and the cushion pad of Embodiment 1.

Further, in mounting the cushion pad 30 to the seat cushion 3, as shown by FIG. 2 and FIG. 10, the respective resin clips 36 are inserted to the inserting holes 11 of the engaging portions from an outer peripheral side to an inner peripheral side of the seat cushion 3 to fold back the respective fabric belts 35 of the cushion pad 30 to a lower inner side. Specifically, as shown by FIG. 11, the width dimension in the left and right direction of the resin clip 36 is designed to be larger than the width dimension in the left and right direction of the inserting hole 11, and therefore, the resin clip 36 is inserted from the outer peripheral side to the inserting hole 11 in a skewed state inclining the resin clip 36. Further, at a point of completely passing the resin clip 36 through the inserting hole 11, the resin clip 36 is made to be in parallel with the strip member 10. Then, both left and right ends of the resin clip 36 are caught by the both left and right seaming portions 13 of the inserting hole 11, and by restricting the both left and right ends from being drawn to detach, the cushion pad 30 is firmly fixed to the seat cushion 3. Also when the resin clip 36 is drawn from the inserting hole 11 in order to detach the cushion pad 30 from the seat cushion 3, the resin clip 36 may be drawn by constituting a state of bringing the resin clip 36 in a skewed state similarly.

As shown by FIG. 1, when the cushion pad 30 is mounted to the cushion base 3b, the resin clip 36 and the strip member 10 are covered to be concealed by the cushion pad 30. The respective strip members 10 are arranged at positions of bringing about a state of precisely tightening the fabric belts 35 when the resin clips 36 are inserted to the inserting holes 11. Therefore, the cushion pad 30 is fixed by uniform loads from three points by the nonstretchable fabric belt 35, and therefore, the cushion pad 30 can firmly be mounted thereto without being positionally shifted even by changing an attitude of the seated person.

Further, the cushion pad 30 can precisely made to be in line with a shape of a surface of the seat cushion 3 by fitting the female buttons 38 of the cushion pad 30 to the male buttons 12 of the seat cushion 3 after firmly mounting the cushion pad 30 to the seat cushion 3 in this way.

Embodiment 2

Figure 12:
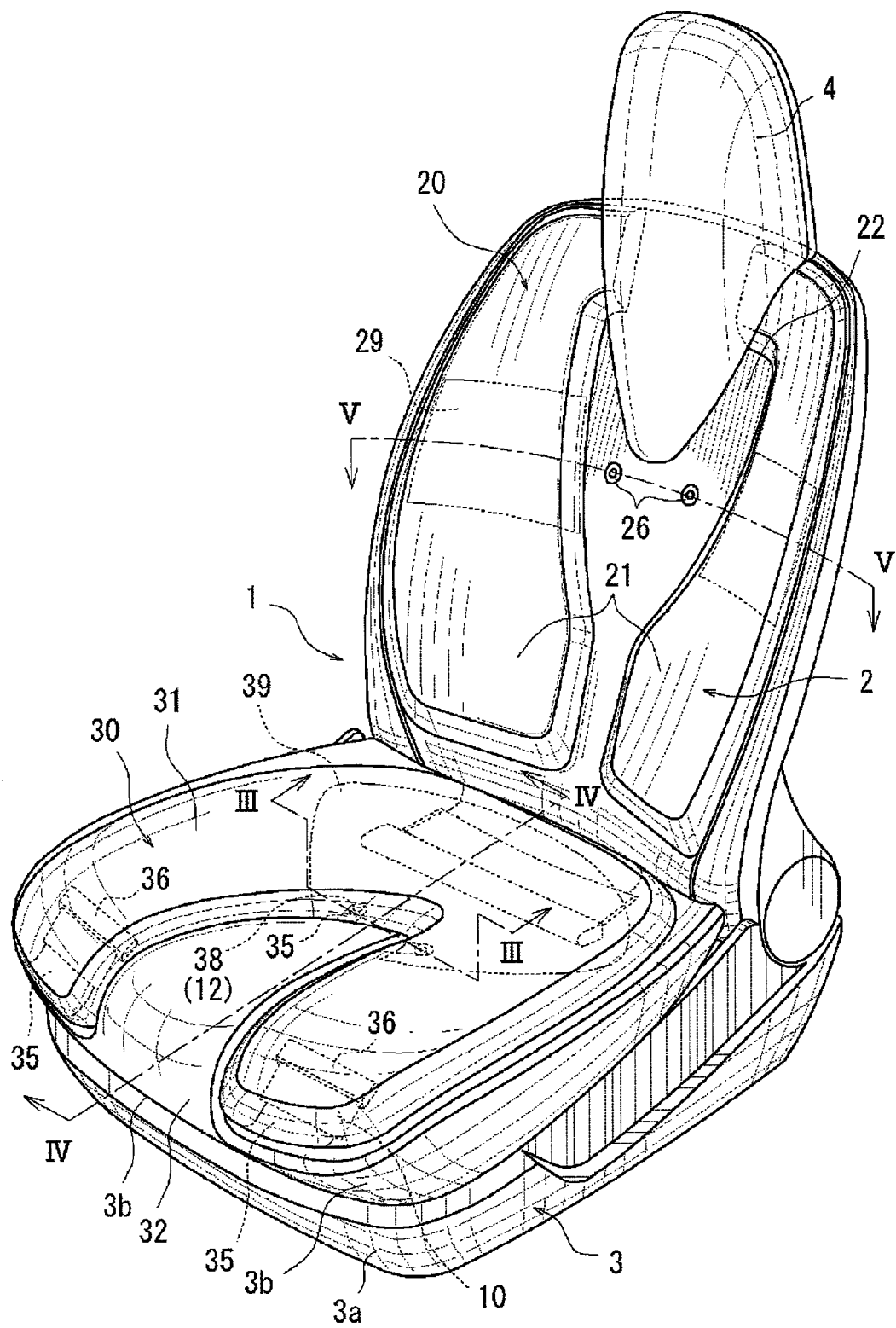
FIG. 12 is a perspective view of a seat mounted with a seat pad of Embodiment 2.
Figure 13:
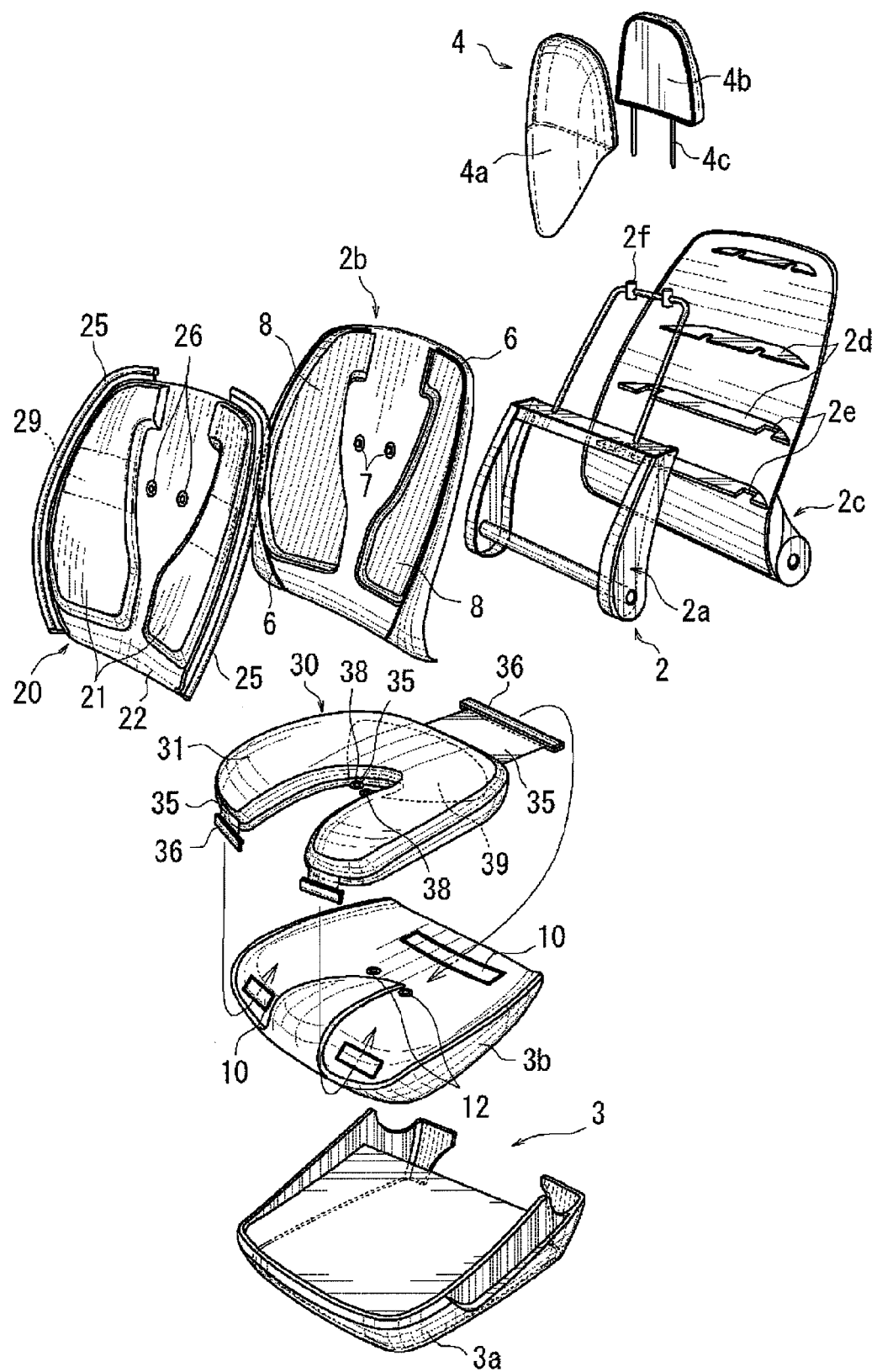
FIG. 13 is a disassembled perspective view of a seat main body and a seat pad of Embodiment 2.

Embodiment 2 is a modified example of Embodiment 1, and basic modes of the seat main body 1 and the back pad 20 and the cushion pad 30 are similar to those of Embodiment 1. As points different from Embodiment 1, as shown by FIG. 12 and FIG. 13, core members 29•39 for holding shapes are respectively included at inner portions of the laminated layers portions 21•31 of the back pad 20 and the cushion pad 30. Further, at the cushion pad 30, the single layer portion 32 is not present at the surface of the cushion pad 30, and also the snap button 38 as the attaching means is provided by way of the fabric belt 35. An explanation will be given centering on a difference from Embodiment 1.

Figure 14:
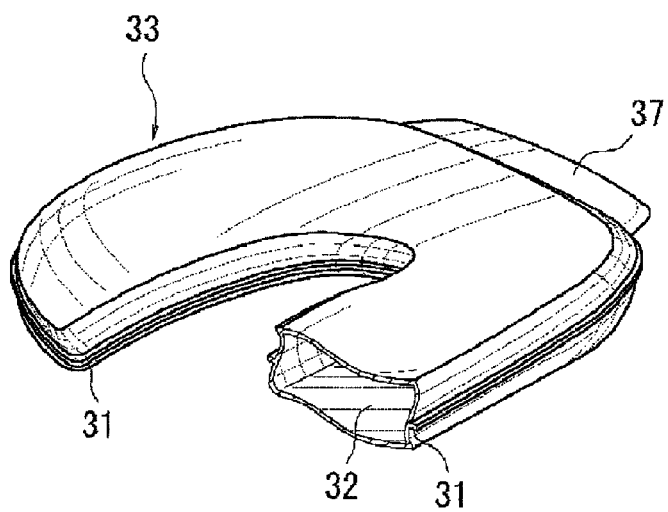
FIG. 14 is a partially broken perspective view of a skin of Embodiment 2.
Figure 15:
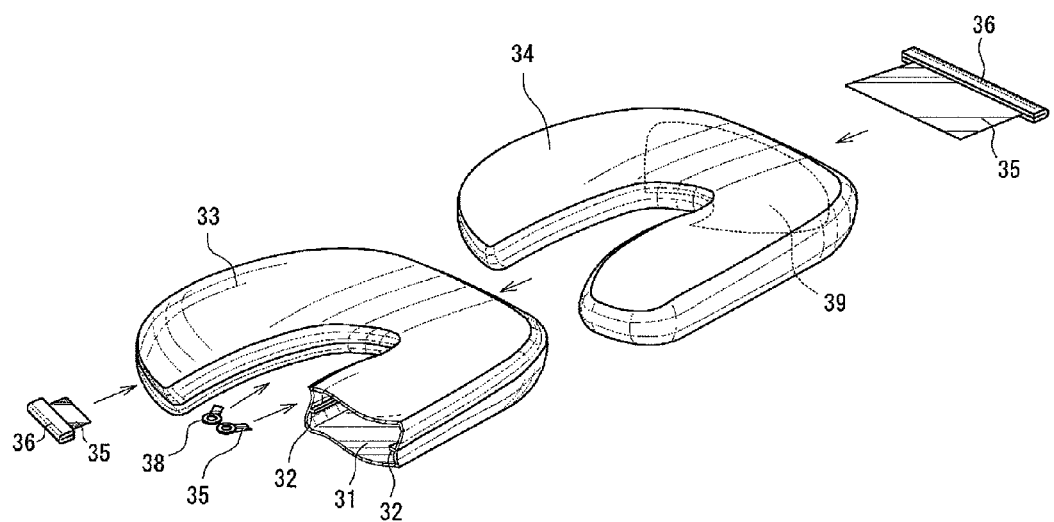
FIG. 15 is a disassembled perspective view of a cushion pad of Embodiment 2.

First, an explanation will be given of the cushion pad 30 having a number of things different from Embodiment 1. Although according to the cushion pad 30 of Embodiment 2, a textile fabric having the plurality of laminated layers portion 31 substantially in a U-like shape by the same pattern similar to preceding Embodiment 1 by hollow weave (refer to FIG. 6), by taking a cutting line thereof to trim the laminated layers portion 31, the cushion pad 30 is provided by a shape as shown in FIG. 14. According to Embodiment 2, the cushioning member 34 is not inserted into the laminated layers portion 31 in this state. As is shown in FIG. 15, after making the skin 33 inside out by constituting a start point by the opening of the opening margin 37 from the state of FIG. 14, the cushioning member 34 is inserted. Thereby, the single layer portion 32 trimming the outer peripheral edge of the skin 33 is present on the inner side of the laminated layers portion 31, and a significant advantage of dispensing with the processing of the terminal of the skin 33 is achieved.

At the bifurcation base end portion of the laminated layers portion 31, the synthetic resin-made core member 39 in a shape of a thin plate fan is embedded at the center portion in the thickness direction of the cushion pad 30. The core member 39 is inserted to the cushioning member 34 molded in a predetermined shape inside by a forming die substantially in a U-like shape by making a cut from an outer peripheral face thereof. By packing the cushioning member 34 embedded with the core member 39 into the laminated layers portion 31 of the skin 33 subjected to hollow weave, the cushion pad 30 can be provided. Or, the core member 39 can also be embedded thereto by insert molding of previously charging the core member 39 into a forming die in molding the cushioning member 34.

On the other hand, the fabric belt 35 cannot be formed by sewing the skin 33 integrally therewith, and therefore, after making the skin 33 upside down as shown by FIG. 15, the fabric belt 35 formed as a separate member may be seamed to a predetermined portion. The single layer portion 32 is not present also at the interval of a bifurcation in a U-like shape, and therefore, also with regard to the snap button 38 as the attaching means, in a state of being fixed to the front end of the fabric belt 35, the fabric belt 35 may be seamed to the predetermined portion of the cushion pad 30. Further, the fabric belt 35 for providing the snap button 38 is provided with stretchability. Further, a male button is used for the snap button 38 of the cushion pad 30 of Embodiment 2, and the snap button 12 arranged at the cushion base 3b is constituted by a female button.

Figure 16:
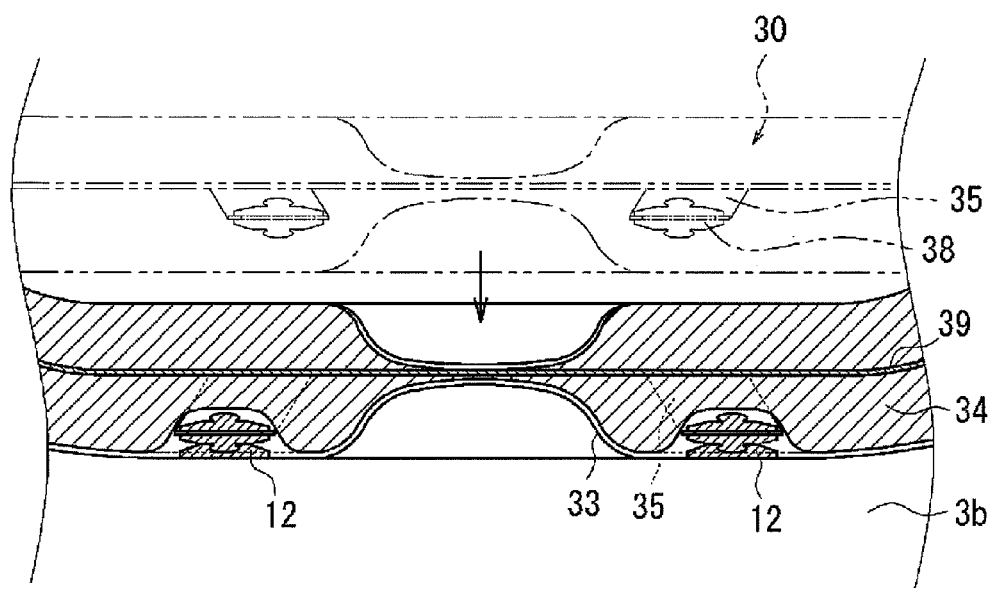
FIG. 16 is a sectional view taken along a line III-III of FIG. 12.
Figure 17:
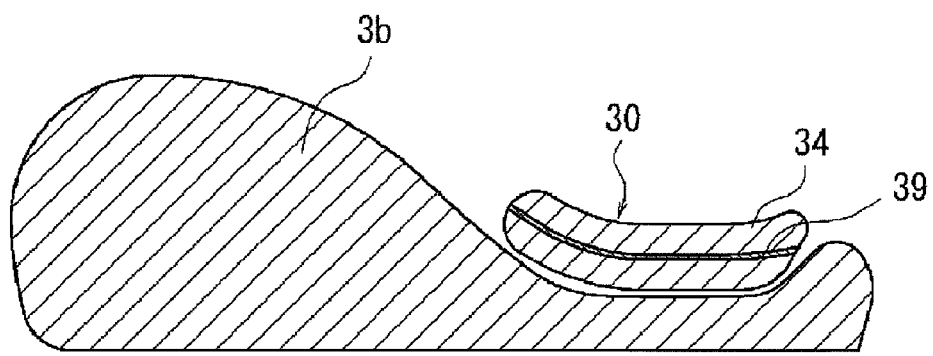
FIG. 17 is an outline sectional view taken along a line IV-IV of FIG. 12.

Also a structure of attaching and detaching the cushion pad 30 to and from the cushion base 3b is basically similar to that of Embodiment 1. As shown by FIG. 12 and FIG. 13, the cushion pad 30 can be mounted to be fixed to the cushion base 3b by inserting the respective resin clips 36 of the cushion pad 30 into the inserting holes 11 of the strip members 10 from the outer peripheral side to the inner peripheral side of the cushion base 3b to be folded back to the lower inner side and also fitting the female buttons 38 of the cushion pad 30 to the female buttons 12 of the cushion base 3b to be folded back to the inner side. An upper face (seating face) of the cushion base 3b is formed with a recessed and projected shape with an object of promotion of design performance or ride comfort, efficient support of a seating attitude, and promotion of a feeling of being fitted to the hip portion. Particularly, the hip portion is constituted by a shape of a bowl bent to a lower side. The snap buttons 12•38 are present for bringing the cushion pad 30 into close contact with the cushion base 3b, at the same time, holding the cushion pad 30 in a shape of a flat plate by a recessed and projected shape in line with a recessed and projected shape of the cushion base 3b having a rigidity higher than that of the cushion pad 30. Specifically, as shown by FIG. 16, when the female button 12 of the cushion base 3b and the male button 38 of the cushion pad 30 are fitted to each other, the two buttons 12•38 are fitted to each other in a state of stretching the stretchable fabric belt 35. Further, at the portion of fitting the snap buttons 12•38, the cushion pad 30 is recessed by a high elastic force thereof. The cushion pad 30 is urged by a strong urge force to a side of the cushion base 3b by a contracting force of the fabric belt 35. Then, by operating a similar urge force also to the core member 39 embedded in the cushioning member 34 of the cushion pad 30, as shown by FIG. 17, the cushion pad 30 is held in a shape precisely in line with the recessed and projected shape of the surface of the cushion base 3b, that is, in a shape of a bowl bent to the lower side at the hip portion, and the cushion pad 30 can excellently be brought into close contact with the cushion base 3b. Other aspects are similar to that of Embodiment 1, and therefore, the same notations are attached to the same members and an explanation thereof will be omitted.

As shown by FIG. 12 and FIG. 13, the back pad 20 of Embodiment 2 is also embedded with the synthetic resin-made core members 29 in a shape of a thin plate at middle portions in the up and down direction of the inner portions of the both left and right laminated layers portions 21. The female buttons 26 of the respective snap buttons as the attaching means bonded to the single layer portion 22 are disposed between the both left and right core members 29 and at middle height positions in the up and down direction of the both left and right core members 29. By presence of the snap buttons 26, the core members 29 are precisely made to be able to be in line with the shape of the surface of the seat back 2. Also the core members 29 of the back pad 20 may be embedded to the cushioning member 24 similar to the case of the cushion pad 30. That is, the cushioning members 24 may be embedded by making cuts to the cushioning members 24 from the outer peripheral sides before being packed to the laminated layers portion 21, or may be embedded by insert molding.

Figure 18:
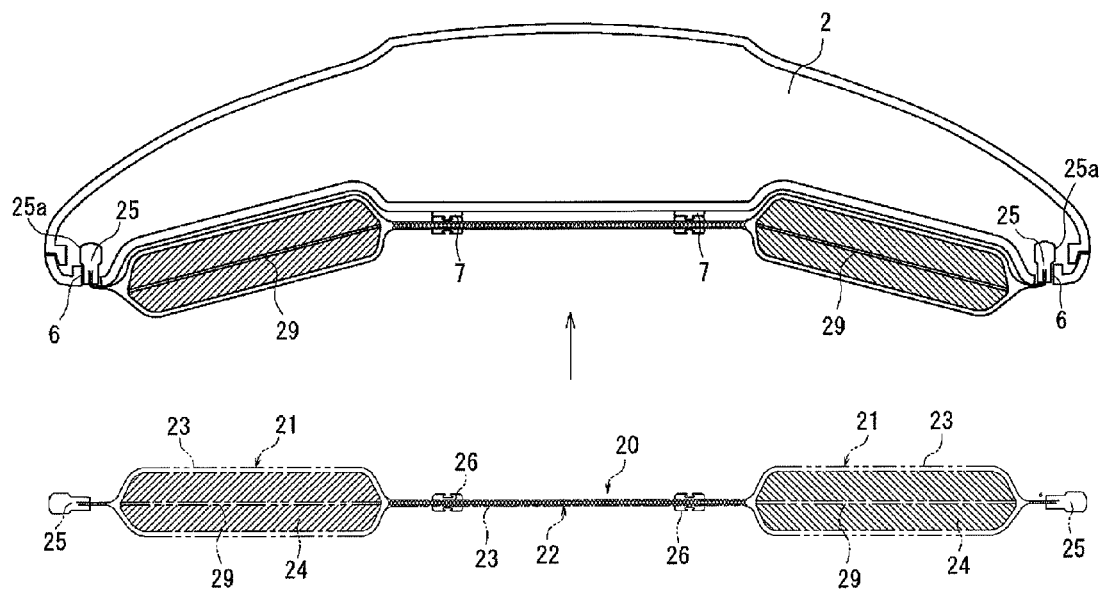
FIG. 18 is a sectional view taken along a line V-V of FIG. 12.

Also the structure of attaching and detaching the back pad 20 to and from the seat back 2 is basically similar to that of Embodiment 1. In a state of detaching the head rest 4 from the seat back 2, as shown by FIG. 18, mounting is facilitated by inserting to fit the resin rail 25 of the back pad 20 to the slit 6 provided at the seating face of the seat back 2. The female button 26 of the back pad 20 is fitted to the male button 7 of the seat back 2 from a state of floating up the center portion in the left and right direction of the back pad 20 from the seating face of the seat back 2. Thereby, when the back pad 20 is mounted to the seat back 2, the rear face of the laminated layers portion 21 and the depth face of the recessed portion 8 are brought into close contact with each other, and the back pad 20 can be precisely made to be in line with the shape of the seating face of the seat back 2 by making the rear face of the single layer portion 22 and the front face of the seat back 2 proximate to each other. Further, by including the core members 29 in the laminated layers portion 21, the shape is held excellently. In detaching the back pad 20 from the seat back 2 for making the back pad 20 upside down or cleaning the back pad 20, in a state of detaching the head rest 4 from the seat back 2, the back pad 20 may only be pulled in the direction of being remote from the seat back 2. Other aspects are similar to that of Embodiment 1, and therefore, the same notations are attached to the same members and an explanation thereof will be omitted.

Other Embodiments

The laminated layers portions 21•31 of the seat pads 20•30 are not limited to the shapes of the above-described embodiments but can adopt other various shapes so far as the laminated layers portions 21•31 are constituted by structures capable of supporting the seated person. Although according to Embodiment 1 and Embodiment 2, the back pad 20 and the cushion pad 30 are molded by special shapes for promoting design performance or function, the back pad 20 and the cushion pad 30 may be constituted by shapes covering the total seating faces of the seat cushion 3 and the seat back 2. Further, also the engaging member and the attaching member may be provided at portions other than those of the above-described embodiments at the outer peripheries of the seat pads 20•30 so far as the engaging member and the attaching member are provided at the center positions in the thickness directions of the laminated layers portions 21•31.

In the cushion pad 30, by making the bulged dimension of the opening margin 37 larger, the opening margin 37 per se can also be used as the fabric belt 35. That is, after packing the cushioning member 34 from the opening formed by the opening margin 37, by fixing the resin clip 36 at the outer peripheral end of the opening margin 37, time and labor of squeezing and seaming the separately formed fabric belt can be dispensed with.

Although according to the cushion pad 30 of Embodiment 1, the single layer portion 32 surrounding the outer periphery of the laminated layers portion 31 is constituted by the dimension as short as possible to be formed to be inconspicuous in an outlook thereof. Conversely thereto, an amount of projecting the single layer portion 32 to an outer side of the laminated layers portion 31 can be constituted by a half or more of the thickness dimension of the laminated layers portion 31, when the cushion pad 30 is mounted to the seat cushion 3, the single layer portion 32 projected to the outer side can also be squeezed between the rear face of the cushion pad 30 and the seating face of the seat cushion 3 by being folded back to the lower side.

The seat pad may be constituted not only by a mode of being mounted to both of the seat cushion 3 and the seat back 2 but may be constituted by a mode of mounting the seat pad only to the seat cushion 3 or only to the seat back 2. Although the engaging members and the engaging portions of the seat cushion 3 are provided on the front side and the rear side of the cushion pad 30, in addition thereto, the engaging member and the engaging portion may be provided also on left and right sides, or may be provided only to the left and right sides. Although the strip member 10 is seamed to the cushion base 3b, the strip member 10 can also be bonded thereto by adhering. The resin clip 36 constituting the engaging member may be smaller than the width dimension in the left and right direction of the strip member 10 so far as the resin clip 36 is larger than the width dimension in the left and right direction between the both left and right seaming portions 13•13 of the strip member 10, that is, that of the inserting hole 11. Naturally, the resin clip 36 may be made to be larger than the width dimension in the left and right direction of the strip member 10. Further, although in the seat cushion 3, engaging portion is constituted by the strip member 10 laminated to the cushion base 3b, an engaging mechanism by the resin rail and the slit may be adopted as in the back pad 20.

Although the engaging member of the back pad 20 is constituted by the single layer portion 22 laterally prolonged in the left and right direction continuous in series from a start end to a final end and the resin rail 25, the engaging member may partially be divided. Further, a portion of the single layer portion 22 surrounding the outer periphery of the laminated layers portion 21 can also be provided with a vertically prolonged portion projected to an outer side in a plane direction, and the resin rail 25 can be fixed to a front end thereof. A plurality of pieces thereof can be aligned. Further, also the engaging portion of the seat back 2 can be constituted by a strip member laminated to the front face panel 2b as in the engaging portion of the seat cushion 3. A fabric member fabricated separately from the skin 23 may be seamed for fixing the resin rail 25. The back pad 20 may not only be constituted by one member having the plurality of laminated layers portions 21 but may be constituted by a plurality of divided pieces. In this case, the resin rail 25 is fixed over substantially outer peripheries of the respective back pads 20. A shape or an embedding position of the core member 29 for holding the shape is not particularly limited so far as the seat pads 20•30 may be able to be in line with the shape of the surface of the seat main body 1 thereby.

What is claimed is:

1. A seat pad comprising:
a skin including a single layer portion and a laminated layers portion in a shape of a hollow bag; and
a cushioning member enclosed at an inner portion of the laminated layers portion and having a shape the same as the laminated layers portion and having an elasticity;
wherein the laminated layers portion is configured to support a seated person; and
wherein the cushioning member is provided with a predetermined thickness, and the laminated layers portion is formed with recesses and projections of the same shape projected from head and tail faces of the single layer portion by a predetermined amount, and
wherein the cushioning member is configured for being mounted attachably and detachably to a seating face of a seat, and at a position of the seating face of the seat facing the laminated layers portion, and the laminated layers portion is configured to fit in a recessed portion of the seating face when the laminated layers portion is mounted to the seat.

2. The seat pad according to claim 1,
wherein the laminated layers portion includes a plurality of pieces cut from one sheet of woven cloth.

3. The seat pad according to claim 2,
wherein a thickness of the laminated layers portion is provided with a dimension twice as much as a depth of the recessed portion; and
wherein when the seat pad is mounted to a seat main body of the seat, although a rear face of the laminated layers portion is configured to be brought into close contact with a bottom face of the recessed portion, a rear face of the single layer portion is configured not to be brought into close contact with a surface of the seat.

4. The seat pad according to claim 3,
wherein at least a portion of an outer peripheral edge of the seat pad is provided with an engaging member capable of being engaged with an engaging portion formed at the seat; and
wherein the engaging member is provided at a center portion in a thickness direction of the seat pad.

5. The seat pad according to claim 4,
wherein the engaging member is provided at a front end of a flexible fabric member extended from the outer peripheral edge of the seat pad.

6. The seat pad according to claim 5,
wherein the single layer portion comprises the fabric member.

7. The seat pad according to claim 6,
wherein an attaching member is provided on the seat pad to align the seat pad with a shape of a surface of the seat when the seat pad is mounted to the seat.

8. The seat pad according to claim 7,
wherein colors of a surface and the rear face of the laminated layers portion are made to differ from each other.

9. A method of fabricating a seat pad,
sewing a textile fabric in a shape of a hollow bag by hollow weave, the textile fabric having a single layer portion and a laminated layers portion;
forming the laminated layers portion based on supporting a portion and a shape of a physical body of a seat occupant;
forming a continuously bulged opening margin at a portion of an outer periphery of the laminated layers portion for inserting and enclosing a cushioning member inside the laminated layers portion; and
providing the seat pad by inserting the cushioning member inside the laminated layers portion from an opening of the continuously bulged opening margin.

10. The method of fabricating a seat pad according to claim 9,
wherein the opening of the continuously bulged opening margin is sealed by providing an engaging member configured to engage with an engaging portion formed at a seating face of a seat and to mount the seat pad to the seat.

11. A seat using an attachable and detachable type seat pad;
wherein a seating face of a seat having a seat cushion and a seat back is attachably and detachably mounted with the seat pad having an elasticity;
wherein the seat pad includes a single layer portion and a laminated layers portion in a shape of a hollow bag, and a cushioning member enclosed at an inner portion of the laminated layers portion and having a shape the same as the laminated layers portion and having an elasticity;

wherein a surface side and a rear face side of the seat pad are constituted by shapes constituting a face symmetry relative to a middle face of the seat pad; and wherein a recessed portion constituting a shape the same as the laminated layers portion is formed at a position of the seating face of the seat facing the laminated layers portion.

12. The seat using the attachable and detachable type seat pad according to claim 11;

wherein at least a portion of an outer peripheral edge of the seat pad is provided with an engaging member;

wherein the seat is provided with an engaging portion capable of engaging with the engaging member of the seat pad;

wherein the engaging portion is formed by a strip member laminated to the seating face of the seat, both end portions in a longitudinal direction thereof being bonded to the seat; and wherein the seat pad and the seat are attachably and detachably engaged with each other when the engaging member of the seat pad is inserted into the strip member.

13. The seat using an attachable and detachable type seat pad according to claim 12;

wherein engaging portions are provided at a plurality of portions of the seat, and the respective engaging portions are disposed at the rear face of the seat pad when the seat pad is mounted to the seat; and wherein engaging members are provided at a plurality of portions of the seat pad and correspond to the engaging portions provided at the plurality of portions of the seat.

14. The seat using an attachable and detachable type seat pad according to claim 13;

wherein in a direction of a plane of the seat pad, pairs of the respective engaging portions and the respective engaging members are arranged at at least one of positions diagonal to and positions opposed to at least other pair of the engaging portion and the engaging member.

15. The seat using an attachable and detachable type seat pad according to claim 12;

wherein the engaging member is provided at a front end of a flexible fabric member extended from an outer peripheral edge of the seat pad; and wherein a width dimension in a left and right direction of the engaging member is at least larger than an interval between both bonded portions of the strip member.

16. The seat using an attachable and detachable type seat pad according to claim 15;

wherein the seat is provided with an attaching member capable of being attached to an attaching member provided at the seat pad.

17. The seat using an attachable and detachable type seat pad according to claim 16;

wherein the attaching member is a snap button;

wherein the snap button of the seat pad is provided by way of a fabric member in a shape of a flexible strip extended from a center in a thickness direction of an outer peripheral face of the seat pad; and wherein the fabric member for the snap button is provided with a stretchability.

18. The seat using an attachable and detachable type seat pad according to claim 11;

wherein the engaging portion comprises a slit formed by notching the seating face of the seat in a shape of a groove along an outer shape of the seat pad; and wherein the seat pad and the seat are attachably and detachably engaged with each other when the engaging member of the seat pad is inserted into the slit of the seat.

19. The seat using an attachable and detachable type seat pad according to claim 18;

wherein the seat is provided with an attaching member attachable to an attaching member provided at the seat pad.

* * * * *